United States Patent
Jang et al.

(10) Patent No.: US 12,049,724 B2
(45) Date of Patent: Jul. 30, 2024

(54) CLOTHING REGISTRATION DEVICE AND CLOTHING RECOMMENDATION DEVICE, AND ONLINE SYSTEM COMPRISING SAME

(71) Applicant: LG Electronics Inc., Seoul (KR)

(72) Inventors: Guang Jang, Seoul (KR); Mina Suh, Seoul (KR); Sungmin You, Seoul (KR); Sukhyun Lim, Seoul (KR); Juhee Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 550 days.

(21) Appl. No.: 17/275,988

(22) PCT Filed: Sep. 11, 2019

(86) PCT No.: PCT/KR2019/011816
§ 371 (c)(1),
(2) Date: Mar. 12, 2021

(87) PCT Pub. No.: WO2020/055154
PCT Pub. Date: Mar. 19, 2020

(65) Prior Publication Data
US 2022/0031068 A1    Feb. 3, 2022

(30) Foreign Application Priority Data

Sep. 12, 2018  (KR) .................. 10-2018-0108969
Sep. 11, 2019  (KR) .................. 10-2019-0112636

(51) Int. Cl.
*D06F 58/00*  (2020.01)
*D06F 34/04*  (2020.01)
(Continued)

(52) U.S. Cl.
CPC .............. *D06F 58/00* (2013.01); *D06F 34/04* (2020.02); *D06F 34/18* (2020.02); *D06F 34/28* (2020.02);
(Continued)

(58) Field of Classification Search
CPC .. D06F 58/44; D06F 2101/02; D06F 2103/02; D06F 2105/58; D06F 58/00;
(Continued)

(56) References Cited

U.S. PATENT DOCUMENTS 8,068,676 B2    11/2011  Zhang et al.
9,189,886 B2 *  11/2015  Black ................. G06Q 30/0601
(Continued)

FOREIGN PATENT DOCUMENTS

CN    101328659    12/2008
CN    102443998     5/2012
(Continued)

OTHER PUBLICATIONS

Extended European Search Report in European Appln. No. 19859110.9, dated May 10, 2022, 9 pages.
(Continued)

*Primary Examiner* — Mahendra R Patel
(74) *Attorney, Agent, or Firm* — Fish & Richardson P.C.

(57) ABSTRACT

The present invention relates to an online system and a control method therefor, the online system comprising clothing devices which may receive physical information of a user, notify of a change in the physical information, register clothing information held by the user, put together the schedule of the user, weather, preferences, the trend in the area where the user is located, and information on the clothing being sold, and recommend customized clothing to the user.

15 Claims, 22 Drawing Sheets

(51) Int. Cl.

| | | |
|---|---|---|
| *D06F 34/18* | (2020.01) | |
| *D06F 34/28* | (2020.01) | |
| *D06F 58/10* | (2006.01) | |
| *D06F 58/20* | (2006.01) | |
| *D06F 58/26* | (2006.01) | |
| *D06F 58/44* | (2020.01) | |
| *G06F 3/02* | (2006.01) | |
| *G06F 3/04842* | (2022.01) | |
| *G06F 3/16* | (2006.01) | |
| *G06Q 30/0601* | (2023.01) | |
| *G06T 11/60* | (2006.01) | |
| *G06V 10/22* | (2022.01) | |
| *G06V 10/26* | (2022.01) | |
| *G06V 10/44* | (2022.01) | |
| *G06V 10/56* | (2022.01) | |
| *G06V 20/60* | (2022.01) | |
| *G06V 40/10* | (2022.01) | |
| *G06V 40/20* | (2022.01) | |
| *D06F 101/02* | (2020.01) | |
| *D06F 103/02* | (2020.01) | |
| *D06F 103/28* | (2020.01) | |
| *D06F 105/32* | (2020.01) | |
| *D06F 105/40* | (2020.01) | |
| *D06F 105/58* | (2020.01) | |
| *H04N 7/18* | (2006.01) | |

(52) U.S. Cl.
CPC ............ *D06F 58/10* (2013.01); *D06F 58/203* (2013.01); *D06F 58/263* (2013.01); *D06F 58/44* (2020.02); *G06F 3/02* (2013.01); *G06F 3/04842* (2013.01); *G06F 3/167* (2013.01); *G06Q 30/0625* (2013.01); *G06Q 30/0631* (2013.01); *G06Q 30/0643* (2013.01); *G06T 11/60* (2013.01); *G06V 10/22* (2022.01); *G06V 10/26* (2022.01); *G06V 10/44* (2022.01); *G06V 10/56* (2022.01); *G06V 20/60* (2022.01); *G06V 40/103* (2022.01); *G06V 40/20* (2022.01); *D06F 2101/02* (2020.02); *D06F 2103/02* (2020.02); *D06F 2103/28* (2020.02); *D06F 2105/32* (2020.02); *D06F 2105/40* (2020.02); *D06F 2105/58* (2020.02); *G06T 2210/16* (2013.01); *H04N 7/18* (2013.01)

(58) Field of Classification Search
CPC .......... D06F 34/04; D06F 34/18; D06F 34/28; D06F 58/10; D06F 58/203; D06F 58/263; D06F 2103/28; D06F 2105/32; D06F 2105/40; D06F 73/02; D06F 58/26; D06F 58/30; G06F 3/02; G06F 3/04842; G06F 3/167; G06Q 30/0625; G06Q 30/0631; G06Q 30/0643; G06Q 30/0271; G06Q 30/0623; G06Q 30/0613; G06V 10/22; G06V 10/26; G06V 10/44; G06V 10/56; G06V 40/103; G06V 40/20; G06V 20/60; G06V 20/20; G06V 40/10; H04N 5/232; H04N 7/18; G06T 11/60; G06T 2210/16; G06T 19/006; A47B 67/005; A47F 10/00

See application file for complete search history.

(56) References Cited

U.S. PATENT DOCUMENTS

| | | | | |
|---|---|---|---|---|
| 10,573,077 B2 * | 2/2020 | Wagner | ................. | H04N 13/293 |
| 10,664,903 B1 * | 5/2020 | Haitani | ................. | G02B 27/017 |
| 11,537,979 B2 * | 12/2022 | Mathew | ................. | H04W 4/70 |
| 11,910,920 B2 * | 2/2024 | Jang | ................. | G06F 3/02 |
| 2005/0016012 A1 * | 1/2005 | Yang | ................. | D06F 73/02 34/486 |
| 2009/0116698 A1 * | 5/2009 | Zhang | ................. | G06Q 30/0601 345/581 |
| 2010/0236296 A1 | 9/2010 | Choi et al. | | |
| 2012/0317729 A1 | 12/2012 | Song et al. | | |
| 2013/0083999 A1 * | 4/2013 | Bhardwaj | ................. | G06F 18/21 382/165 |
| 2015/0248583 A1 * | 9/2015 | Sugita | ................. | G06T 19/00 348/77 |
| 2016/0042565 A1 | 2/2016 | Osada et al. | | |
| 2017/0090450 A1 * | 3/2017 | Taite | ................. | A47B 61/00 |
| 2017/0350067 A1 | 12/2017 | Choi | | |
| 2018/0002860 A1 | 1/2018 | Song et al. | | |
| 2018/0173807 A1 * | 6/2018 | Prakash | ................. | G06F 16/2379 |
| 2018/0334767 A1 * | 11/2018 | Kim | ................. | D06F 58/10 |
| 2018/0357981 A1 * | 12/2018 | Ng | ................. | G06Q 30/0269 |
| 2019/0188449 A1 * | 6/2019 | Zhang | ................. | G06V 40/172 |

FOREIGN PATENT DOCUMENTS

| | | | | |
|---|---|---|---|---|
| CN | 103597519 | | 2/2014 | |
| CN | 103597519 A | * | 2/2014 | ........... G06F 16/248 |
| CN | 105046280 | | 11/2015 | |
| CN | 105046280 A | * | 11/2015 | ........... G06K 9/4652 |
| CN | 105374058 | | 3/2016 | |
| CN | 105447800 | | 3/2016 | |
| CN | 108166209 | | 6/2018 | |
| CN | 108256975 | | 7/2018 | |
| CN | 110680094 A | * | 1/2020 | ............. A47B 61/00 |
| EP | 1939349 | | 4/2017 | |
| EP | 3269864 | | 1/2018 | |
| EP | 3269864 A1 | * | 1/2018 | ............. D06F 33/02 |
| JP | H01050939 | | 2/1989 | |
| JP | 2003225491 | | 8/2003 | |
| JP | 2006331131 | | 12/2006 | |
| JP | 2012143617 | | 8/2012 | |
| JP | 2013103136 | | 5/2013 | |
| JP | 2014102739 | | 6/2014 | |
| JP | 2016038813 | | 3/2016 | |
| JP | 2017004464 | | 1/2017 | |
| JP | 6089157 B1 | * | 3/2017 | ......... G06F 16/5838 |
| JP | 2017054283 | | 3/2017 | |
| JP | 2017076315 A | * | 4/2017 | |
| JP | 2017095963 | | 6/2017 | |
| KR | 1020090017826 | | 2/2009 | |
| KR | 20110099916 | | 9/2011 | |
| KR | 20120074557 | | 7/2012 | |
| KR | 1020130013237 | | 2/2013 | |
| KR | 1020130109721 | | 10/2013 | |
| KR | 1020160039872 | | 4/2016 | |
| KR | 101736804 | | 5/2017 | |
| KR | 20170060736 A | * | 6/2017 | ............. G06Q 30/06 |
| KR | 1020170060736 | | 6/2017 | |
| KR | 1020170084454 | | 7/2017 | |
| KR | 1020170125855 | | 11/2017 | |
| KR | 1020170137505 | | 12/2017 | |
| KR | 1020180051817 | | 5/2018 | |
| RU | 2604312 | | 12/2016 | |
| RU | 2637981 | | 12/2017 | |
| TW | M454597 | | 6/2013 | |
| WO | WO2016070309 | | 5/2016 | |
| WO | WO-2016070309 A1 | * | 5/2016 | ............. G06F 16/58 |
| WO | WO-2016158896 A1 | * | 10/2016 | ............. G06F 17/50 |
| WO | WO2018076923 | | 5/2018 | |
| WO | WO-2018076923 A1 | * | 5/2018 | ............. A47B 61/00 |
| WO | WO2018212585 | | 11/2018 | |
| WO | WO-2018212585 A1 | * | 11/2018 | ............... D06B 1/02 |

OTHER PUBLICATIONS

Office Action in Australian Appln. No. 2019337284, dated Mar. 31, 2022, 7 pages.
Office Action in Australian Appln. No. 2019338892, dated Mar. 31, 2022, 10 pages.
Extended European Search Report in European Appln. No. 19859109.1, dated Oct. 21, 2022, 10 pages.

(56) References Cited

OTHER PUBLICATIONS

Office Action in Japanese Appln. No. 2021-537426, dated Dec. 20, 2022, 5 pages (with English translation).
Office Action in Japanese Appln. No. 2021-513186, dated May 31, 2022, 11 pages (with English translation).
Office Action in Japanese Appln. No. 2021-537426, dated May 10, 2022, 8 pages (with English translation).
Office Action in Chinese Appln. No. 201980059807.3, dated Jul. 27, 2022, 32 pages (English translation).
Office Action in Chinese Appln. No. 201980059808.8, dated Aug. 3, 2022, 32 pages (English translation).
Office Action in Russian Appln. No. 2021107896, dated Sep. 22, 2021, 8 pages (English translation).
Office Action in Russian Appln. No. 2021109651, dated Aug. 26, 2021, 8 pages (English translation).
PCT International Search Report and Written Opinion in International Appln. No. PCT/KR2019/011821, dated Jan. 20, 2020, 7 pages (with English translation).
PCT International Search Report and Written Opinion in International Appln. No. PCT/KR2019/011816, dated Jan. 10, 2021, 8 pages (with English translation).

\* cited by examiner (a)  (b)

FIG. 16
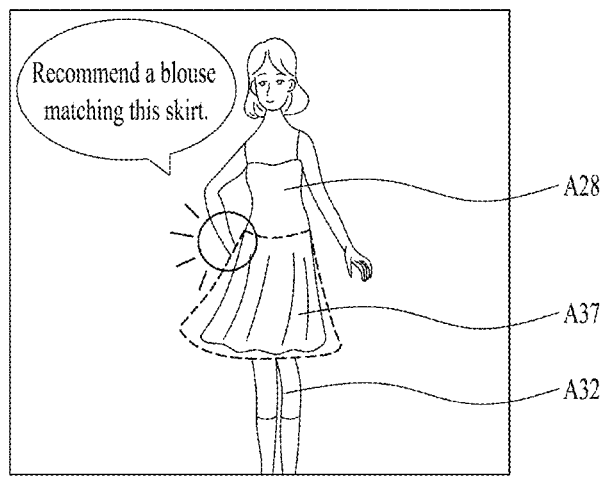
(a)
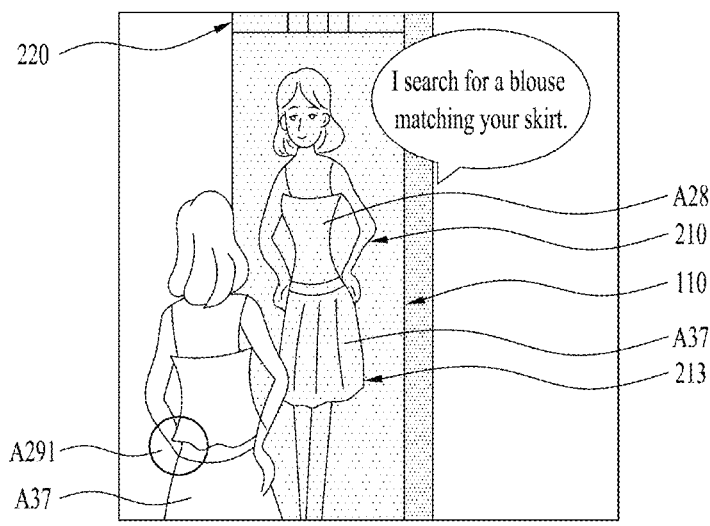
(b)
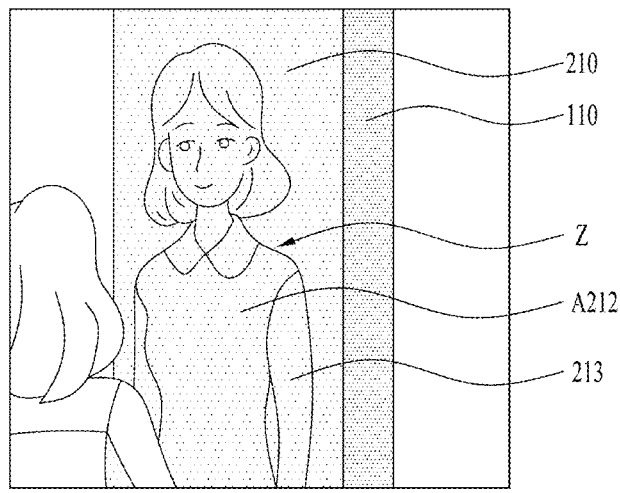
(c)

FIG. 17
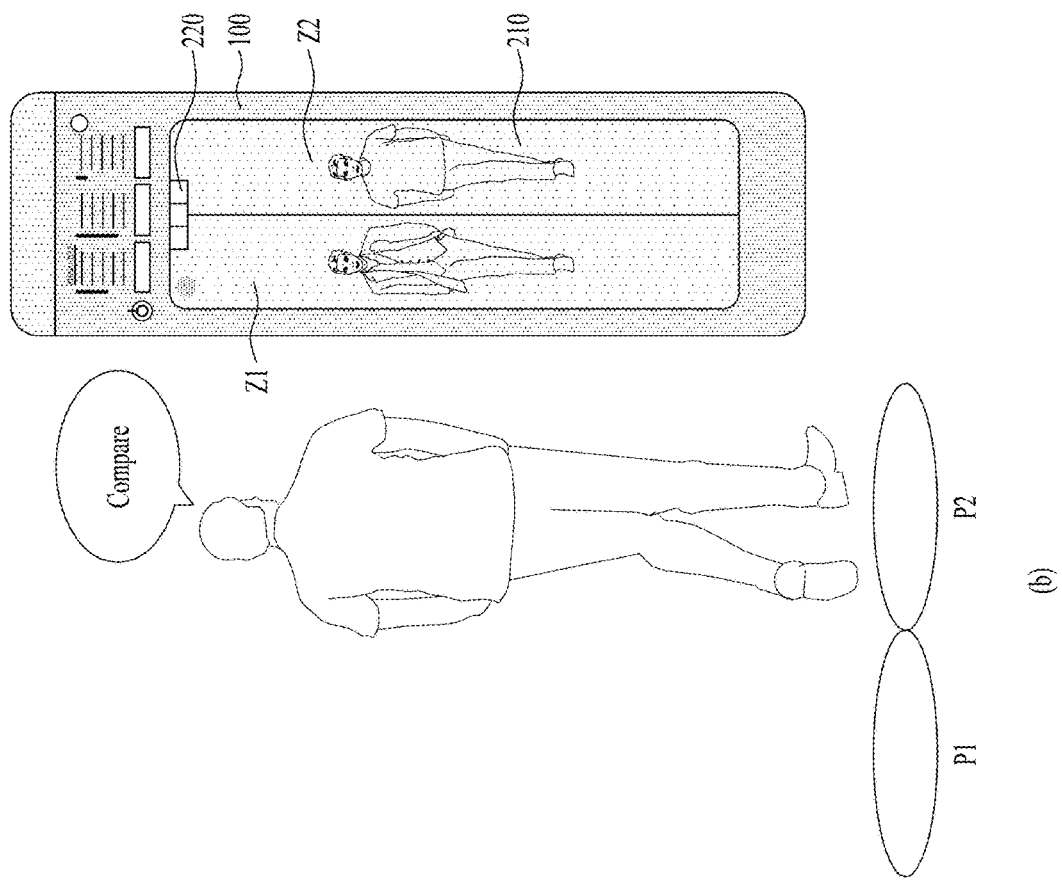
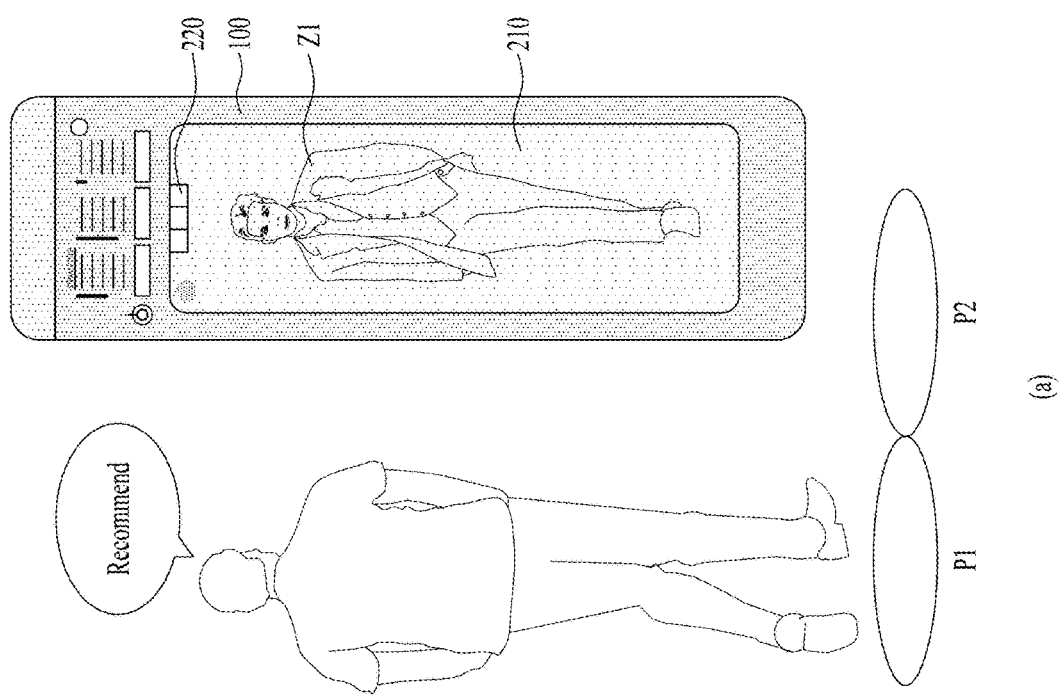

FIG. 19
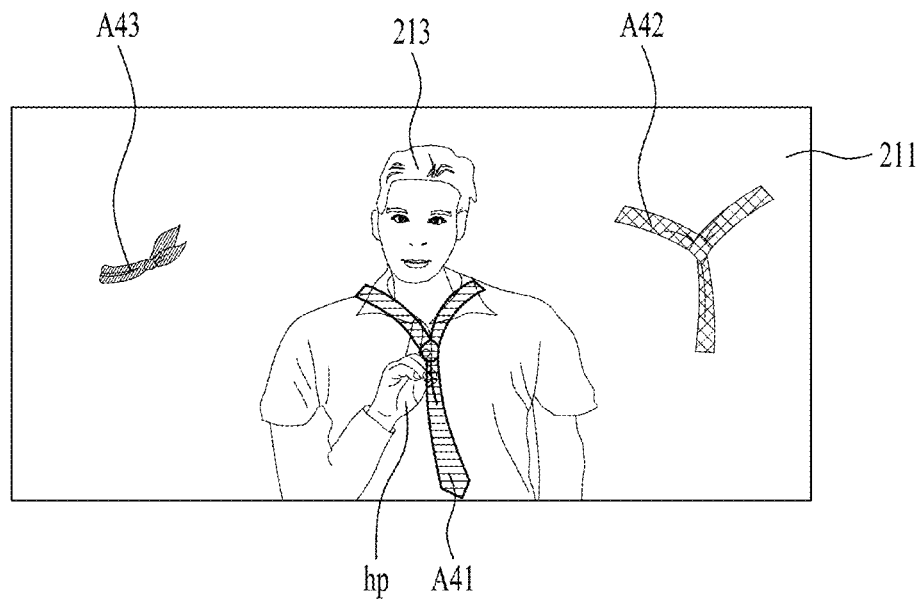
(a)
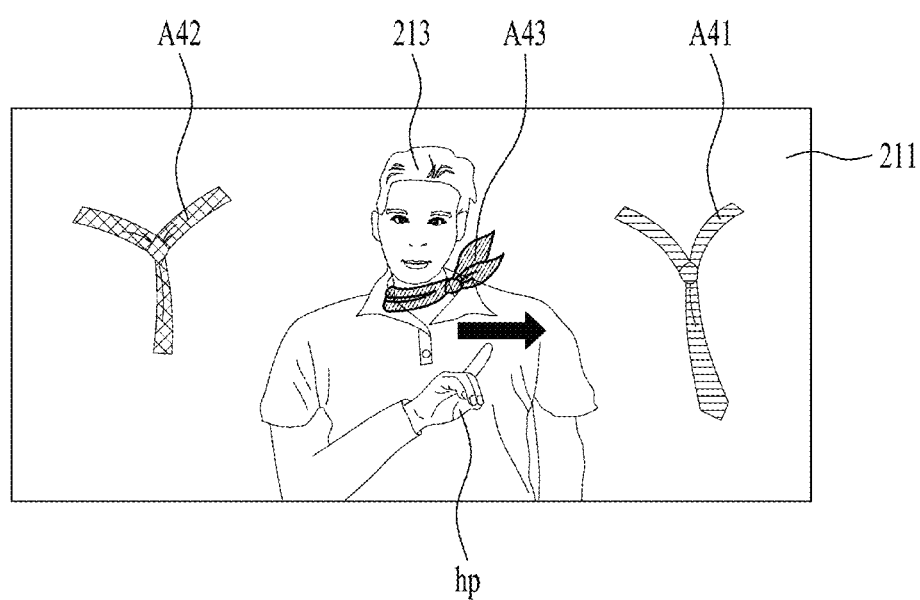
(b)

CLOTHING REGISTRATION DEVICE AND CLOTHING RECOMMENDATION DEVICE, AND ONLINE SYSTEM COMPRISING SAME

CROSS-REFERENCE TO RELATED APPLICATIONS

This application is a National Stage application under 35 U.S.C. § 371 of International Application No. PCT/KR2019/011816, filed on Sep. 11, 2019, which claims the benefit of Korean Application No. 10-2019-0112636, filed on Sep. 11, 2019, and Korean Application No. 10-2018-0108969, filed on Sep. 12, 2018. The disclosures of the prior applications are incorporated by reference in their entirety.

TECHNICAL FIELD

The present disclosure relates to an home appliance capable of imaging a user's body and stored clothing of the user, and recommending suitable clothing for the user according to schedule or weather, etc. and recognizing a state of clothing worn on the user and of determining or guiding an appropriate clothing treating course, and to an on-line system including the home appliance.

BACKGROUND ART

Recently, as a depth sensor function is installed in cameras, etc., the camera accurately acquires body information of the user in a 3D manner. With development of AR (Augmented Reality) technology, only a desired portion of the user's body may be virtually rendered and identified. Accordingly, a virtual fitting system by which the user virtually wear and identify the clothing without actually wears the clothing every time when purchasing or selecting the clothing is being activated.

Specifically, referring to Korean Patent Application Publication No. 10-2014-0077820 (prior art 1), a conventional virtual fitting system acquires detailed information such as a height, weight, size of the user and a length of each joint of the user by scanning the user's appearance using a depth sensor, and creates and stores a 3D model corresponding to the user. Further, referring to Korean Patent Application Publication No. 10-2016-0088112 (prior art 2), a conventional virtual fitting system may match (render) the clothing provided by a seller with the user's 3D model to allow the user to directly and visually identify the appearance of the user wearing the clothing from his or her image.

FIG. 1 shows an embodiment of a conventional virtual fitting system.

Referring to (a) in FIG. 1, a user 1 may stand in front of a virtual fitting device 2 where a camera with a depth sensor is installed. In this connection, the virtual fitting device 2 may display an image of the user 1 imaged by the camera as it is in a mirror manner. In order to accurately grasp the body information of the user 1, a guide-line 3 may be indicated on the virtual fitting device 2 to allow the user to be disposed in a correct position or to take a specific pose.

Referring to (b) in FIG. 1, when the user takes the position or the pose guided by the guide-line 3, the virtual fitting device 2 renders and displays the clothing 5 selected by the user on the user's appearance 4. This allows the user to identify whether the clothing 5 suits the suer without wearing the clothing 5 directly.

In one example, referring to Korean Patent Application Publication No. 10-2017-0115332 (prior art 3), a purchase system allows the user directly to purchase the clothing while the virtual fitting thereof is performed. Thus, the user may not go to a place where the clothing 5 on which the virtual fitting is performed is actually present in order to purchase the clothing 5.

However, in the conventional virtual fitting system, clothing information including a size, shape, and material of the clothing to be rendered must be pre-stored in order to perform the virtual fitting that renders the actual clothing on the user's image. Therefore, this virtual fitting system has a limitation in that virtual fitting may be performed only on specific clothing provided by the seller who knows the clothing information in advance.

Therefore, the user could not perform the virtual fitting on clothing whose clothing information is not provided by the seller.

Further, it is general that a plurality of clothing purchased from a number of sellers who do not provide the clothing information for the virtual fitting are stored in a home of a specific user. Therefore, there is a limitation that the specific user may not perform virtual fitting at all on the clothing that he/she purchased or the clothing that he/she is storing. Therefore, even when the virtual fitting system has been developed, the system may not be generally and actually applied to the the user.

When a plurality of clothing are present, the user may not know which clothing is suitable for him or her. Therefore, the user has to try on the plurality of clothing directly or perform virtual fitting several times. Further, even when the plurality of clothing is virtually fitted, the user may not select clothing optimized for the user due to lack of knowledge of fashion, brand, or and lack of fashion sense.

To solve this problem, a recommendation system has emerged that may recommend appropriate clothing according to the user's body information, purchase ability, and preferences.

Referring to Korean Patent Application Publication No. 10-2017-0006604 (prior art 4), a conventional virtual fitting system recognizes the user's body with a depth sensor, etc., and recommends clothing suitable for the user's body.

Further, referring to Korean Patent Application Publication No. 10-2014-0006294 (prior art 5), a conventional virtual fitting system recommends suitable clothing or brand for a user in consideration of not only the user's body information, but also the user's stored clothing, preferences, and purchase history. As a result, even when the user lacks knowledge or information about the clothing suitable for the use, the clothing suitable for a current state of the user may be selected.

However, the conventional virtual fitting system has a limitation in which the system may recommend the clothing only when clothing information about the clothing to be recommended is pre-identified and pre-stored. Therefore, when the seller who produces the clothing owned by the user does not provide the clothing information, the conventional virtual fitting system has a limitation in that the system may not properly recommend suitable clothing among the clothing owned by the user to the user.

Further, even when a home appliance may perform 3D modeling by scanning a user, the conventional virtual fitting system has a limitation in that the system may not use the home appliance to grasp the user's body change.

Moreover, since the conventional virtual fitting system may only be used in a specific place where a seller providing a virtual system is located, the conventional virtual fitting system may not be applied to continuously observe or recognize the body change of a specific user. Therefore, there is a limitation in that the conventional virtual fitting system may provide customized virtual fitting or recommend clothing to the specific user.

Further, although the conventional virtual fitting system recommends the clothing to the user, the user may not identify or verify whether the clothing is actually suitable for the user. For example, the user may not determine whether the recommended clothing is suitable for a background or situation completely different from a place where the virtual fitting currently is performed. Further, the user may not determine whether the recommended clothing is appropriate for the other person who usually accompanies the user but is absent at a time of virtual fitting.

As a result, there is a problem that the virtual fitting technology customized for the specific user may not be used because there is no home appliance to which the virtual fitting system is applied.

Further, a plurality of home appliances capable of washing or refreshing clothing may be disposed in the home. Therefore, the user may not be able to accurately determine which home appliance treats the clothing worn on the user.

For example, there is a problem in that even though the specific clothing should be subject to washing, the user could not properly treat the clothing by putting the clothing into a home appliance that performs refreshing.

Further, when a home appliance that refreshes the clothing provides a plurality of courses or options, the clothing may not be accurately refreshed because the user does not know which course or option should be performed according to a state of the clothing.

Furthermore, even though the specific clothing should be subject to washing, and when the user recognizes that the clothing is incorrectly inserted into the clothing treating apparatus that performs the refresh, the user should re-enter the course or option of the washing machine that performs washing. This is inconvenient.

As a result, conventionally, even though a plurality of home appliances communicate with each other or are managed through a specific server, there is a limitation in that the plurality of home appliances may not operate in association with each other.

DISCLOSURE

Technical Purpose

A purpose of the present disclosure is to provide a home appliance that may store clothing information about clothing owned by a user.

A purpose of the present disclosure is to provide a home appliance capable of computing clothing information based on an image of an clothing owned by the user.

A purpose of the present disclosure is to provide a home appliance that may acquire clothing information based on an image of clothing worn on a user.

A purpose of the present disclosure is to provide a home appliance that may recommend suitable clothing to the user in consideration of weather, schedule, body information, fashion, preference, and stored clothing list.

A purpose of the present disclosure is to provide a home appliance that may analyze both owned clothes and clothes to be purchased and recommend clothing to the user, based on the analysis result, and an on-line system including the same.

A purpose of the present disclosure is to provide a home appliance that may recommend clothing other than clothing owned by the user and may allow the user to purchase the recommended clothing.

A purpose of the present disclosure is to provide a home appliance that may compare recommended clothing with other clothing, compare the recommended clothing with other person information, or change a background and compare the recommended clothing with the changed background, and an on-line system including the same.

A purpose of the present disclosure is to provide a home appliance that may repeatedly image a specific user and detect body change thereof.

A purpose of the present disclosure is to provide a home appliance that may distinguish wearable clothing and non-wearable clothing from each other based on a specific user's body change.

Technical Solution

The on-line system according to the present disclosure includes a clothing treating apparatus that may dry clothing with hot-air or steam. The clothing treating apparatus may dry the clothing by supplying heated air and moisture to a chamber. In a chamber, a support bar on which a hanger holding the clothing is mounted may vibrate to remove wrinkles from the clothing and help deodorize the clothing. The clothing treating apparatus may have a separate water supply tank for supplying the steam, and may include a collection tank that collects moisture condensed in a process of dehumidifying a space where clothing is placed.

The on-line system according to the present disclosure may further include a server and an external terminal device capable of providing information while communicating with the clothing treating apparatus. The clothing treating apparatus may be configured to output a schedule on the day using a speaker and a screen as output means. The clothing treating apparatus may recommend items such as clothing or accessories that are suitable for current weather using the output means. For example, the clothing treating apparatus may guide words or voices such as "Prepare an umbrella because it may rain tomorrow" using the output means.

Further, the clothing treating apparatus may search for a seller of clothing or accessories according to the user's request. Further, the clothing treating apparatus may display clothing or accessories provided by the searched seller.

The user may order selected clothing or accessories via the clothing treating apparatus. The clothing treating apparatus may include a virtual fitting (VR) fitting service to help the user to decide the order of the clothing or accessories.

The clothing treating apparatus may be connected to an external terminal device or the Internet via a communication module or an access point (AP). The clothing treating apparatus may identify a user's schedule stored in the external terminal device or the server, or may identify a schedule registered in an Internet account set by the user.

Further, the clothing treating apparatus may obtain weather information from the Internet. The schedule or weather information may be directly input by the user through the input means of the clothing treating apparatus. The input means may include a voice recognition microphone, a touch panel and a control panel disposed on a front face of the door. For example, the clothing treating apparatus may prepare N types of image (styling images, coordination images), or voice information in consideration of the user's schedule and the weather of the day. When the image is created, the apparatus may combine the clothing of the user registered in a database (DB) to create one or more images. The image of the combination of clothes may be an image composed of the combination only of clothes, or may be an image on which the clothing is displayed using a user image as a background.

The clothing treating apparatus according to the present disclosure may recommend clothing based on registered clothing. The clothing treating apparatus may output an image to the output means, based on the clothes registered in the DB, the schedule, and the weather. The output means may include a speaker and a display panel disposed on a front face of the door.

For example, the user may say "what to wear for tomorrow's meeting" to the clothing treating apparatus. In response, the output means may display a recommendation image along with a response indicating "I recommend 3 styles for the meeting schedule" on a front face of the door. Further, the clothing treating apparatus may display words such as "Please choose a style you want" using the output means and thus allow the user to an input a control command. The user may select a desired image via voice or touch.

When the user selects the desired image, the output means may output "I start virtual fitting of a first style". The output means may move the corresponding image according to the user's pose.

The clothing treating apparatus may carry out a clothing purchase. The image generated by the clothing treating apparatus may include images provided by clothing and accessory producers/sellers in addition to the clothing owned by the user. The clothing treating apparatus may ask if the user is willing to purchase clothing or accessories that is absent in the created image or the image selected by the user. When the clothing treating apparatus confirms the user's intention to purchase the clothing or accessories, the clothing treating apparatus may send an online order form to a seller of the corresponding clothing or accessory.

For example, the user could output the intention "I'll wear this style". In response, the output means may output "I recommend purchase of a tie suitable for the selected style". An image of a purchasable tie may be displayed on the output means. The user may select a desired item from the displayed image.

In one example, virtual fitting may simultaneously display the user image and the clothing/accessory image on the display device. The clothing or accessories may be rendered or combined with the user image via the input means (touch panel, voice recognition unit, and motion recognition unit). Further, the user may change and select the images.

The on-line system may be used as follows. The user wakes up in the morning and identifies a travel schedule and a departure time using the external terminal device. The user may output, to the clothing treating apparatus, "What should I wear during a business trip?. In response, the clothing treating apparatus may output "I prepares coordination according to the schedule and weather information from August 31 to September 1 in Berlin" and then may start analyzing the clothing. After the analysis, the clothing treating apparatus may display a coordination for each day of the week (weather icon). The user currently wearing midsummer clothes may then output " it looks too hot!". Then, the clothing treating apparatus says, "current Berlin temperature is that in early autumn in Korea, and it may be chilly, and thus be sure to bring a cardigan while traveling".

The user may select a 'additional recommendation function' on the day having the most important schedule by touching the input means. The clothing treating apparatus may say "I start AR fitting from now". Thus, the user may take a pose toward the clothing treating apparatus. The user may visually identify a state of wearing clothing indicated by the clothing treating apparatus, even when the user is currently wearing underwear. The user may select the recommended clothing, and may identify that the user does not have a tie recommended along with the recommended clothing via the output means. Thus, the user makes a purchase request while saying "Please purchase this tie". When the clothing treating apparatus receives the purchase request, the apparatus may request additional information while saying "Please, input a delivery address?". The user may provide a name of a hotel where the user stays during a business trip as the delivery address.

In one example, the on-line system according to the present disclosure may automatically detect the state of the clothing, and may provide a course or option suitable for this state. For example, the user may input a coat in the clothing treating apparatus and press a care execution button. The clothing treating apparatus may automatically select a course or option based on a analyzing result of the clothing using a chemical sensor or a camera. The apparatus may recommend the selected course using the output means.

The on-line system according to the present disclosure may perform virtual fitting. The virtual fitting may include matching another clothing with a specific clothing the user is currently wearing. The clothing treating apparatus images the user using a camera. The display device may display the user's image. The user may indicate the clothing worn on the user via hand motion or voice. The clothing treating apparatus may compute clothing suitable for the indicated clothing. In addition to the indicated clothing, other clothing may be removed from the image. The output means may output a new image obtained by combining the stored clothing of the user with an image on which the user is wearing specific clothing. A plurality of images may be displayed according to the user's request. The output means may display the plurality of images sequentially.

A list of the clothing or accessories owned by the user may be stored in the clothing treating apparatus, etc. The clothing treating apparatus may instruct the user to input information about clothing, or receive an image stored in the user's external terminal device and separate a clothing image therefrom and store therein the clothing image.

The clothing treating apparatus may detect change in the user's body shape, and may notify the change in the body shape to the user. When the change in the body shape is detected, the clothing treating apparatus may select the clothing which the user may not wear and display the selected clothing on the display device.

In one example, the on-line system according to the present disclosure may provide various virtual fitting services. For example, different virtual fittings may be provided depending on where the user stands in front of the clothing treating apparatus.

For example, when a user stands in a region that occupies 50% or more of a display area provided by the display device, the clothing image based on the schedule and the weather may be recommended by the apparatus. The clothing treating apparatus may receive a command to change the recommended image, and may modify the recommended image using the clothing stored in the DB or purchase target clothing.

Further, when the user is standing in a region occupying an area smaller than 50% of the display area provided by the display device, a plurality of recommended images generated on that day may be displayed on the display device at the same time. That is, two or more recommended images may be displayed thereon at the same time. Alternatively, the recommended images may be sequentially displayed according to the user's comparison command.

When the clothing treating apparatus recognizes both a specific user and a different user, the apparatus may recommend appropriate clothing for each of the specific user and the different user. According to the user's choice, the clothing treating apparatus may independently recommend clothing for each of the specific user and the different user or may recommend mutually-related clothing such as a couple-look for the specific user and the different user.

Further, in the virtual fitting scheme provided by the on-line system according to the present disclosure, when the user rotates the body, the clothing may be visible in varying angles. Further, when the user rotates only the accessory, the user may view only the accessory at varying angles. The clothing treating apparatus may identify whether the user rotates the body or only the accessory using a motion camera.

The clothing treating apparatus according to the present disclosure may register the user's 3D profile using the camera. Further, the clothing treating apparatus according to the present disclosure may access the server and match a measured size of clothing based on each brand with the 3D profile. In this way, the apparatus may recommend a suitable brand for the user. Further, the clothing treating apparatus according to the present disclosure may recommend clothes suitable for the 3D profile among currently stored clothing.

Technical Effect

The present disclosure may realize a home appliance that may store clothing information about clothing owned by a user.

The present disclosure may realize a home appliance capable of computing clothing information based on an image of an clothing owned by the user.

The present disclosure may realize a home appliance that may acquire clothing information based on an image of clothing worn on a user.

The present disclosure may realize a home appliance that may recommend suitable clothing to the user in consideration of weather, schedule, body information, fashion, preference, and stored clothing list.

The present disclosure may realize a home appliance that may analyze both owned clothes and clothes to be purchased and recommend clothing to the user, based on the analysis result, and an on-line system including the same.

The present disclosure may realize a home appliance that may recommend clothing other than clothing owned by the user and may allow the user to purchase the recommended clothing.

The present disclosure may realize a home appliance that may compare recommended clothing with other clothing, compare the recommended clothing with other person information, or change a background and compare the recommended clothing with the changed background, and an on-line system including the same.

The present disclosure may realize a home appliance that may repeatedly image a specific user and detect body change thereof.

The present disclosure may realize a home appliance that may distinguish wearable clothing and non-wearable clothing from each other based on a specific user's body change.

BRIEF DESCRIPTION OF THE DRAWINGS

FIG. 16 shows another embodiment in which the on-line system according to the present disclosure recommends clothing.

FIG. 17 shows an additional embodiment in which the on-line system according to the present disclosure recommends clothing.

FIG. 19 shows still yet another embodiment in which the on-line system according to the present disclosure recommends clothing.

DETAILED DESCRIPTION

Figure 1:
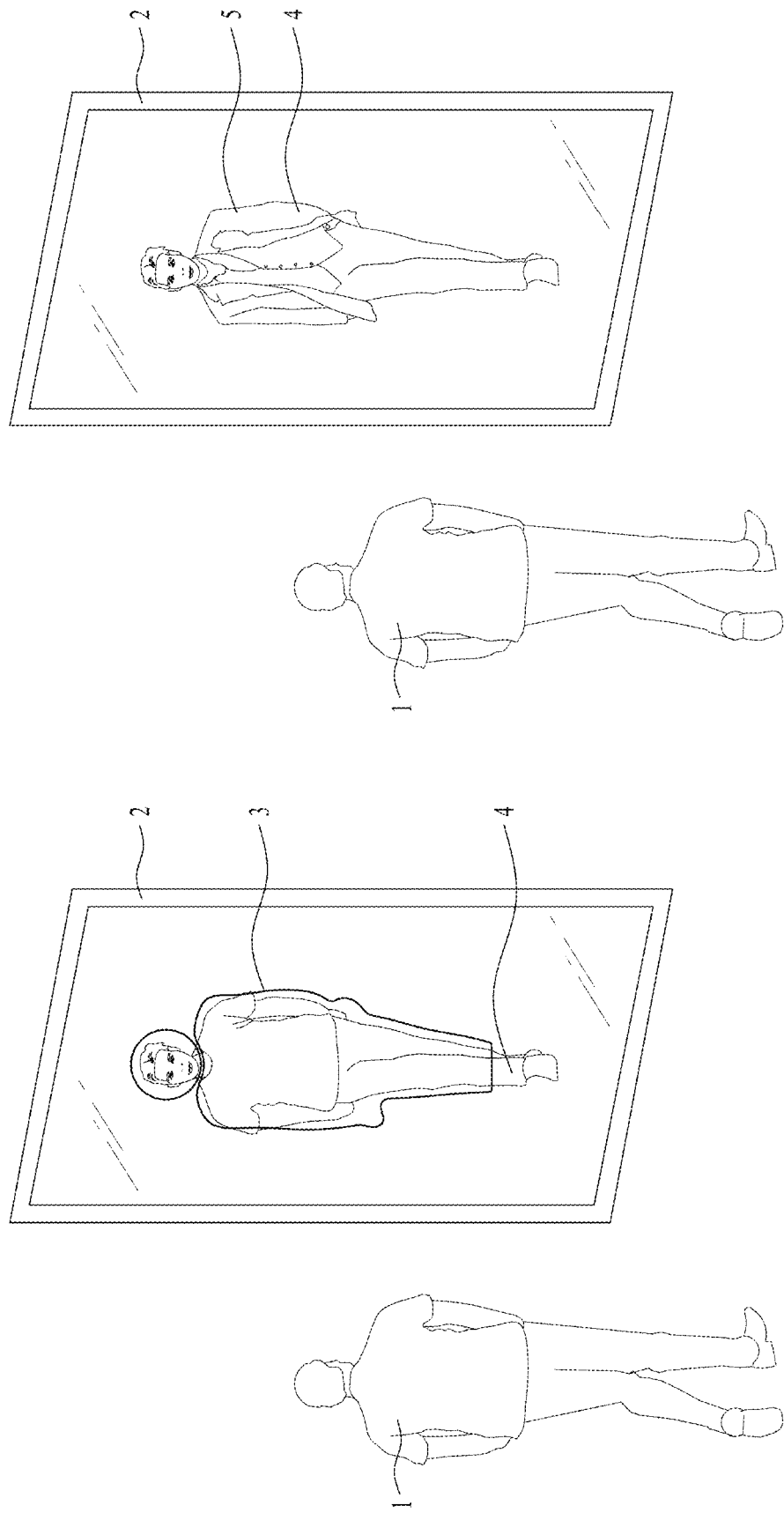
FIG. 1 shows a conventional system that recommends clothing.

Hereinafter, exemplary embodiments disclosed herein will be described in detail with reference to the accompanying drawings. Herein, the same or similar reference numerals are allocated to the same or similar components in different embodiments. Descriptions thereof are replaced with first descriptions thereof. As used herein, the singular forms "a" and "an" are intended to include the plural forms as well, unless the context clearly indicates otherwise.

Further, in describing the embodiments disclosed herein, when it is determined that detailed descriptions of a related known component may obscure the gist of the embodiments disclosed herein, the detailed descriptions thereof may be omitted. Further, it should be noted that the accompanying drawings are presented for easy understanding of the embodiments disclosed herein and should not be construed as limiting the technical spirit disclosed herein to the accompanying drawings.

Figure 2:
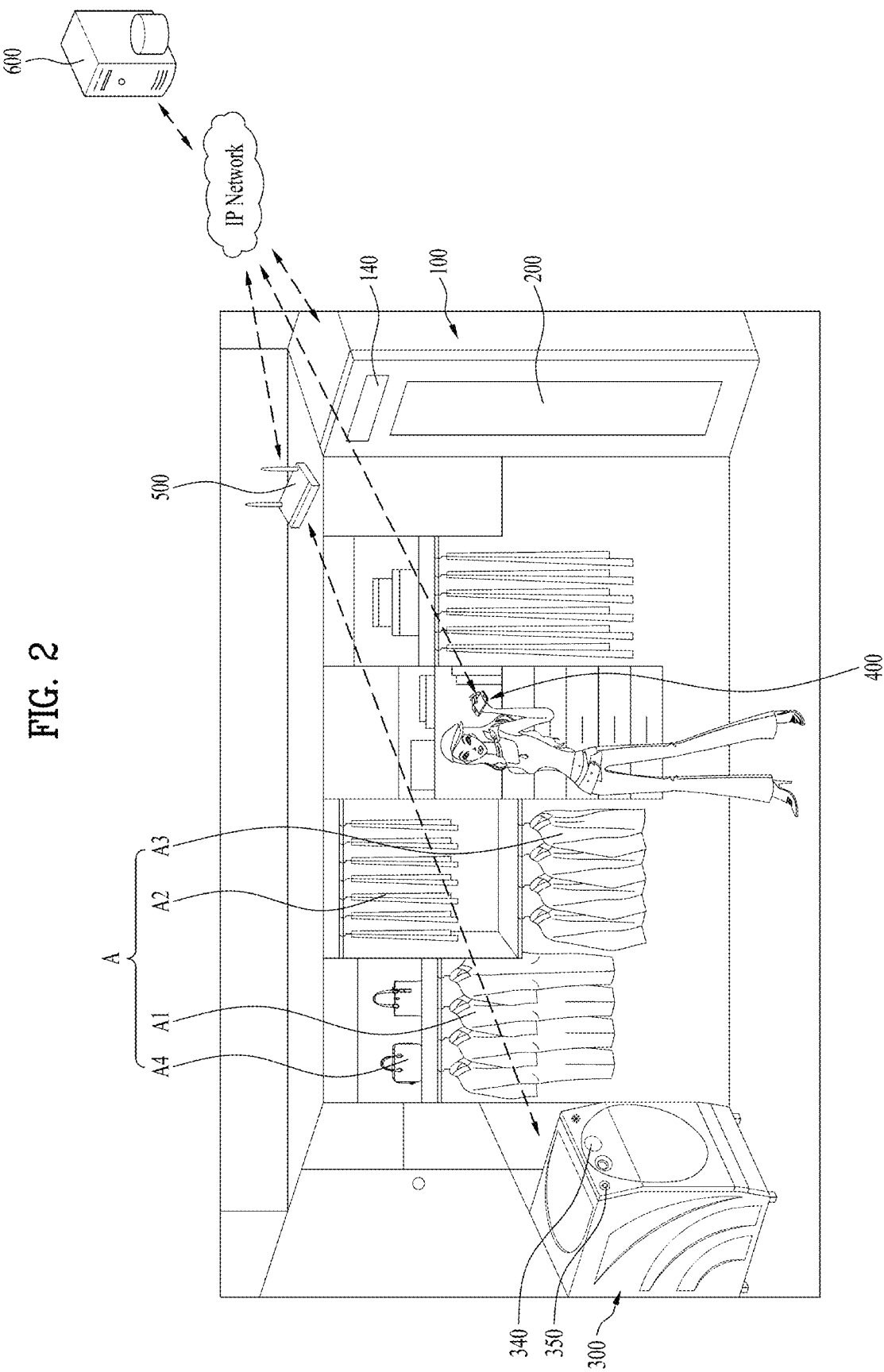
FIG. 2 shows a structure of an on-line system according to the present disclosure.

FIG. 2 shows an on-line system according to one embodiment of the present disclosure.

A plurality of home appliances that may be controlled by a specific user may be arranged indoors, for example, in a home. Further, a plurality of clothes A that may be worn by the specific user may be arranged or stored indoors, for example, in a home.

The plurality of home appliances may include a clothing registration apparatus configured to register clothing and a clothing recommendation apparatus configured to recommend clothing. Each of the clothing registration apparatus and clothing recommendation apparatus may be embodied as a home appliance.

In this connection, when the home appliance performs a function of registering clothing, the home appliance may be referred to as the clothing registration apparatus. When the home appliance performs a function of recommending clothing, the appliance may be referred to as the clothing recommendation apparatus.

That is, the clothing registration apparatus and the clothing recommendation apparatus are defined in terms of functions. Thus, when a home appliance such a washing machine, a refrigerator, a vacuum cleaner or an external terminal device has a function to register clothing, the appliance may be classified as the clothing registration apparatus. When a home appliance such a washing machine, a refrigerator, a vacuum cleaner or an external terminal device has a function to recommend clothing, the appliance may be referred to as the clothing recommendation apparatus.

In other words, when the clothing treating apparatus that refreshes clothing with hot-air or steam registers the clothing, the apparatus may act as the clothing registration apparatus. When the clothing treating apparatus that refreshes clothing with hot-air or steam has the clothing recommendation function, the apparatus may act as the clothing recommendation apparatus.

That is, when the clothing treating apparatus has a clothing recommendation function and a clothing registering function, the apparatus may correspond to both the clothing registration apparatus and the clothing recommendation apparatus.

The plurality of home appliance may include a washing machine 300 capable of washing and drying at least one of the plurality of clothes A using detergent, etc., and a clothing treating apparatus 100 capable of supplying hot-air or steam to at least one of the plurality of clothes A and refreshing the at least one of the plurality of clothes A.

The plurality of clothes A may include at least one of one or more overcoats A1 such as coats or jumpers, one or more tops A2 such as a shirt or blouse, T-shirt, one or more bottoms A3 such as pants or skirts, and accessory A4 such as a bag or sunglasses, noble metal, or a scarf. Clothes such as one-piece dress which may not be classified as a top or bottom may be collectively referred to as an overcoat.

The clothing treating apparatus 100 may include a refreshing-related input interface 150 that receives commands to perform arbitrary courses or options that may refresh at least one of the clothes A, and a refreshing-related output interface 140 that may output a state of the course or option. Further, the washing machine 300 may include a washing-related input interface 350 that receives a command to perform an arbitrary course or option that may wash at least one of the clothes A, and a washing-related output interface 340 that may output the state of the course or option. Accordingly, the user may input target clothes A into the clothing treating apparatus 100 or the washing machine 300 and then directly input the command to individually control and operate the clothing treating apparatus 100 or the washing machine 300.

In one example, the user may want to remotely control the washing machine 300 and the clothing treating apparatus 100, or to operate the washing machine 300 and the clothing treating apparatus 100 in conjunction with each other. Further, the user may want to actively familiarize him/her with or utilize the various functions of the washing machine 300 and the clothing treating apparatus 100.

To this end, the on-line system according to one embodiment of the present disclosure may include a server 600 through which the user may remotely control the washing machine 300 and the clothing treating apparatus 100 or perform pairing therebetween.

The server 600 may provide external information including regional information or weather information necessary for the washing machine 300 and the clothing treating apparatus 100, and may deliver various programs thereto and perform updates thereof. The server 600 may be provided from a company who manufactures and sells the clothing treating apparatus 100 and the washing machine 300. Accordingly, the clothing treating apparatus 100 and the washing machine 300 may be connected to the server 600 to perform a command transmitted from the server 600, or use information or algorithms provided from the server 600.

In one example, the clothing treating apparatus 100 or the washing machine 300 may be directly connected to the server 600 for communication therebetween, or may be configured to connect to an access point (AP) 500 to communicate with the server 600.

Therefore, the server 600 may register an unique device ID of each of the clothing treating apparatus 100 and the washing machine 300 via the AP 500, or store port information or IP information of the AP 500 in association with the clothing treating apparatus 100 and the washing machine 300.

In one example, the user using the clothing treating apparatus 100 or the washing machine 300 may remotely receive a service request to control the clothing treating apparatus 100 and the washing machine 300, or may request specific functions to the server 600.

Therefore, the on-line system according to one embodiment of the present disclosure may include an external terminal device 400 to allow the user to directly access the server 600 to control the clothing treating apparatus 100 and the washing machine 300, or to request various services provided from the server 600. The external terminal device 400 may refer to a device such as a mobile phone, a smartphone, a notebook, and a computer, which is separate from the home appliance or the server and may include devices having a communication module to enable communication with an external component.

An application program that may allow the external terminal device 400 to connect to the server 600 may be installed on the external terminal device 400. Accordingly, the external terminal device 400 may communicate directly with the server 600, and the server 600 may communicate with the clothing treating apparatus 100 and the washing machine 300.

As a result, the user may request a remote service via the external terminal device 400 and easily grasp information such as service execution and completion. Further, the clothing treating apparatus 100 and the washing machine 300 may be controlled by the external terminal device 400 while not being directly connected to the external terminal device 400.

In one example, the clothing treating apparatus 100 has usually a vertical dimension larger than that of the washing machine 300. That is, the clothing treating apparatus 100 generally has a vertical dimension greater than a horizontal dimension to accommodate unfolded clothing therein. For example, the clothing treating apparatus 100 may be taller than the user. Further, due to the nature of the clothing treating apparatus 100, the clothing treating apparatus 100 may be disposed where the clothes A is stored. Therefore, when the clothing treating apparatus 100 may act as a mirror, the user may not move to an actual mirror when wearing the clothes A.

To this end, the clothing treating apparatus 100 may further include a fitting unit 200 that displays a state in which the user wears the clothing on an exposed face thereof. The fitting unit 200 may be embodied as a panel that may reflect light and may be configured to reflect the user's body as it is. Further, the fitting unit 200 has a height larger than a width so that an entire body of the user may be reflected thereon as much as possible. Therefore, the user may identify a state in which the user is holding or wearing the clothing A refreshed in the clothing treating apparatus 100, or may identify a state in which the user is holding or wearing the clothing A stored near the clothing treating apparatus 100.

An example in which the fitting unit 200 is disposed on the clothing treating apparatus 100 has been described. However, this is only one embodiment. In another example, the fitting unit 200 may be disposed on a home appliance such as the washing machine 300, a refrigerator or a vacuum cleaner or may be disposed on the external terminal device 400.

In one example, the user may not know which clothing among the plurality of clothing A is suitable for the user and may want to know how to combine the plurality of clothing A to wear the combination thereon.

Further, as a height of the user increases or a weight of the user increases, the user may not recognize which of the plurality of clothing A suits or does not suit the user.

In this situation, the user must repeatedly wear the plurality of clothing A to identify which of the plurality of clothing A suits or does not suit the user. Even when you wear the plurality of clothing A repeatedly, the user may not be sure that the clothing the user wears is suitable for the user.

To this end, the on-line system according to one embodiment of the present disclosure may provide a virtual fitting service by which the user may indirectly identify a state in which the user wears the plurality of clothing via the fitting unit 200 even when the user does not directly wear the plurality of clothing A. Specifically, the on-line system according to the present disclosure may display a state in which the plurality of clothing A are rendered on an image or a screen of the user displayed on the fitting unit 200.

In one example, the plurality of clothing may be a purchase target clothing that the user wants to purchase, or may be clothing that the user directly stores. In other words, the user may want to know the clothing to be purchased that suits the user or is necessary for the user. The user may want to know which one of the plurality of clothing the user owns is suitable for the user.

The on-line system according to one embodiment of the present disclosure is configured to apply the virtual fitting service to not only the clothing to be purchased by the user, but also clothing the user owns, and may recognize and store a material, shape, size, volume, and color of the plurality of clothing A held by the user for recommendation thereof.

Further, the on-line system according to one embodiment of the present disclosure may recognize and store the user's height, weight, volume, length and of arms and legs, etc., and may compute a state in which the user wears the clothing.

Accordingly, the on-line system according to one embodiment of the present disclosure may be configured to recommend specific clothing among the plurality of clothing A to the user in consideration of at least one of current weather, user preference, and fashion. Further, the system may be configured to compute further necessary clothing in addition to the plurality of clothing A and recommend purchase thereof to the user.

Specifically, the on-line system according to one embodiment of the present disclosure may be configured to consider information on clothing owned by the user, information on clothing that the user may purchase, the user's body information, the user's schedule, the user's preferences, current in-fashion clothing, and weather information, etc. and then recommend appropriate clothing or purchase thereof based on the considerations to the user via the fitting unit 200. In this connection, the clothing itself recommended by the on-line system according to one embodiment of the present disclosure may be recommended to the user. Alternatively, the clothing may be rendered to the user's image in an real manner, and thus a state equivalent a state in which the user is actually wearing the clothing may be displayed and recommended.

In one example, both the clothing treating apparatus 100 and the washing machine 300 among the home appliances may treat the clothing. Therefore, the user may not know exactly whether to refresh her/his clothing using the clothing treating apparatus 100 or wash the clothing using the washing machine 300.

Therefore, in the on-line system according to one embodiment of the present disclosure, the clothing treating apparatus 100 may be configured to determine the wrinkling level or the contamination level of the clothes. When the contamination level is high, the clothing treating apparatus 100 may be configured to indicate to the user that washing of the clothing is performed using the washing machine 300. Furthermore, the clothing treating apparatus 100 may directly transfer the contamination level or the material of the clothing to the washing machine 300 via the server 600 or the AP 500, etc. to allow the washing machine 300 to determine a suitable course or option based on the contamination level or the material.

In one example, the user may not be able to accurately recognize or be familiar with the course or option provided from the clothing treating apparatus 100. Therefore, the on-line system according to one embodiment of the present disclosure may be configured so that the clothing treating apparatus 100 may automatically determine an appropriate course or option based on an analyzing result of the wrinkling level or the contamination level of the clothes.

Figure 3:
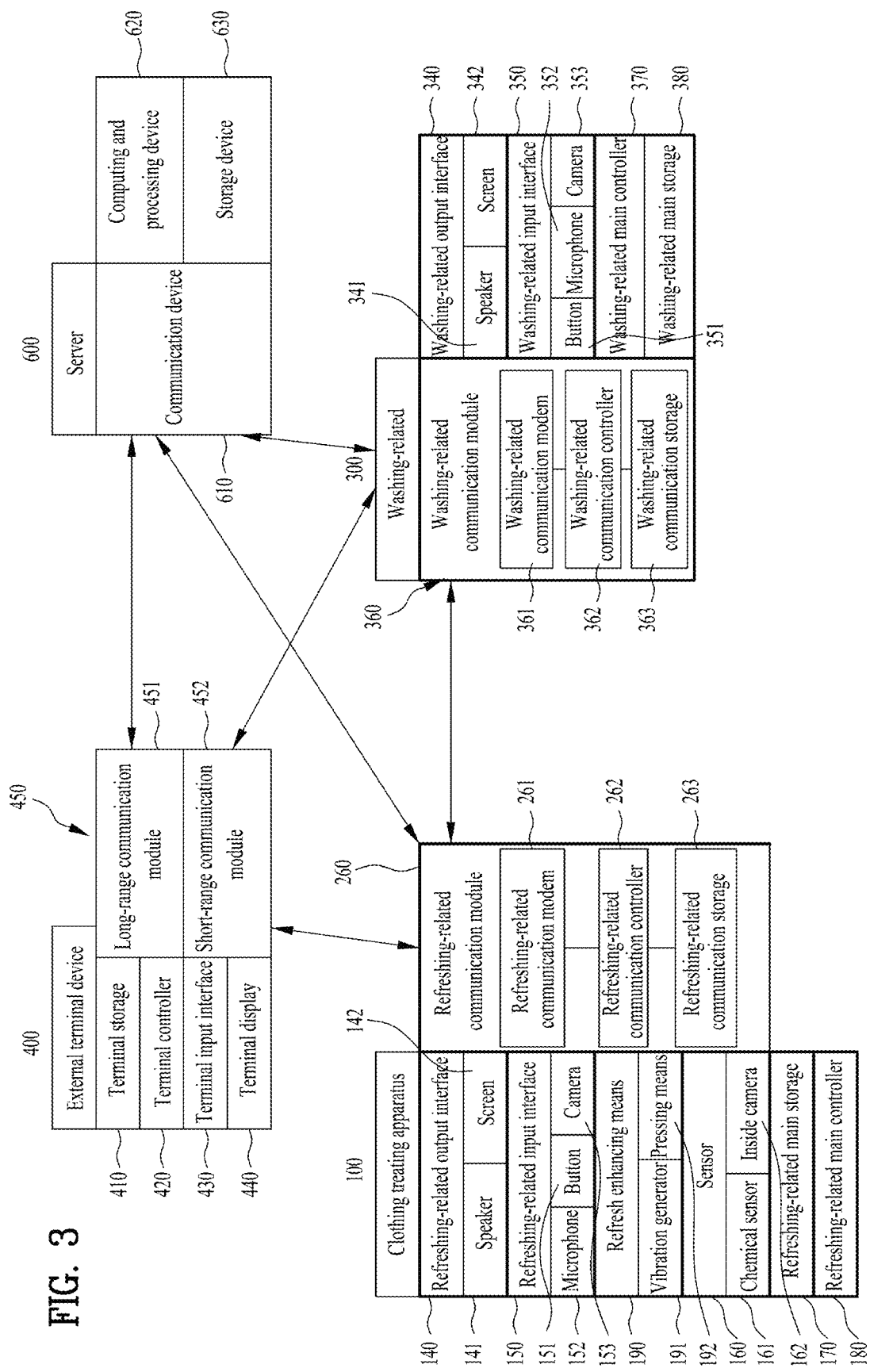
FIG. 3 shows a configuration of the on-line system according to the present disclosure.

FIG. 3 shows one embodiment of a structure of on-line system according to the present disclosure capable of performing the above-described functions.

The external terminal device 400 of the on-line system according to one embodiment of the present disclosure includes a terminal input interface 430 for inputting a command to operate the external terminal device, a terminal display 440 that displays the state of the external terminal device 400 and information received from server 600, a long-range communication module 451 configured to communicate with the server 600 disposed in a remote location, a short-range communication module 452 configured to communicate with the home appliances such as the clothing treating apparatus 100 or the washing machine 300 disposed adjacent thereto, a terminal controller 420 that controls the components of the external terminal device, and a terminal storage 410 that stores information received from the terminal input interface or the communication module.

The short-range communication module may be configured to communicate with a communication device within a certain distance, for example, using radio frequency based communication protocols such as WIFI, Bluetooth, and ZigBee. The long-range communication module may be configured to communicate with a communication device at a remote location via a base station or a communication network using 3G, LTE, or 4G.

The server 600 according to one embodiment of the present disclosure may include a communication device 610 configured to communicates with the external terminal device 400 or communicate with the home appliance such as the clothing treating apparatus 100 or the washing machine 300, or the AP 300, a computing and processing device 620 that generates or analyzes various control signals, and a storage device 630 that stores information generated or received by or from the external terminal device, the home appliance, or the computing and processing device.

Specifically, the storage device 630 of the server 600 may store therein the user's stored clothing information AI, the user's body information BI, background information DI where the user is located or may be located, other person information EI including body information of the other person who accompanies the user, and clothing information of the other person, and payment information FI required for the user to make a purchase online. Those information may be obtained from the user's external terminal device 400, and the home appliance such as the clothing treating apparatus 100 or the washing machine 300. The stored clothing information AI, the user's body information BI, etc. may be collected via the external terminal device 400 or the fitting unit 200 disposed in the home appliance. Further, the storage device 630 may store therein a recommendation algorithm capable of recommending which clothing is suitable for the user at a current time based on the above information.

The recommendation algorithm may be embodied as an algorithm in which when at least one of the user's body information, the schedule, the weather information, and the clothing information AI selected by the user is input thereto, suitable clothing therefor is immediately output therefrom.

The recommendation algorithm may be provided directly by the seller who sells the home appliance. For example, big data including clothing which people in a region where the user is located, in a age group similar to the user, and having similar occupation to that of the user, etc., wear, and other clothing data provided from the clothing sellers may be collected and stored in the storage device 630 of the server 600. The computing and processing device 620 of the server may compute the big data based on deep learning to generate the recommendation algorithm. The recommendation algorithm may be stored in the storage device 630 or transmitted to the external terminal device 400 or the home appliance including the clothing treating apparatus 100 or the washing machine 300 through the communication device 610. Detailed descriptions thereof will be described later.

The clothing treating apparatus 100 according to one embodiment of the present disclosure may include a refreshing-related main storage 170 in which an arbitrary course or option to refresh the clothing is stored, a refreshing-related main controller 180 to execute one course or option of the arbitrary courses or options, and a refreshing-related communication module 260 configured to communicate with the home appliance such as the washing machine 300, the server 600, the external terminal device 400 or the AP 500.

The refreshing-related main controller 180 may be configured to prevent standby power consumption by cutting off power when an operation of the clothing treating apparatus 100 is completed or stopped. However, the refreshing-related main controller 180 may be configured to allow the refreshing-related communication module 260 to maintain a state in which power is always supplied to the refreshing-related communication module 260 such that the refreshing-related communication module 260 maintains a communication state with the server 600.

The clothing treating apparatus 100 may include a refreshing-related input interface 150 configured to input a command to perform one of the arbitrary courses or options, and a refreshing-related output interface 140 to output the state of the clothing treating apparatus or information received from the refreshing-related communication module 260.

For example, the refreshing-related input interface 150 and the refreshing-related output interface 140 may be disposed on an outer face of the clothing treating apparatus 100 to facilitate user access thereto. The refreshing-related input interface 150 may include a refreshing-related button 152 for inputting the washing course/option or the power, a refreshing-related microphone 151 for receiving sound signals such as voice commands, and a refreshing-related camera 153 for obtaining image signals. Further, the refreshing-related output interface 140 may include a washing-related screen or a refreshing-related screen 142 for presenting information using an image, and a refreshing-related speaker 141 for outputting a sound signal. Further, the refreshing-related output interface 140 may be embodied as a touch panel and configured to serve as a refreshing-related input interface.

The refreshing-related communication module 260 may include a refreshing-related communication modem 261 configured to communicate with the server 600, the AP 300, the external terminal device 400, and the home appliances such as the washing machine 300, a refreshing-related communication controller 262 configured to control the refreshing-related communication modem 261, and a refreshing-related communication storage 263 that stores information received from the refreshing-related communication modem 261 or information generated from the refreshing-related communication controller 262. The refreshing-related communication module 260 may be configured to act as a short-range communication module and a long-range communication module as in the external terminal device 400. The refreshing-related communication module 260 may be configured to receive the recommendation algorithm provided from the server 600 and store the algorithm in the refreshing-related communication storage 263, and transmit the recommendation algorithm to the fitting unit 200.

The clothing treating apparatus 100 may further include a sensor 160 capable of recognizing or detecting the contamination level or the wrinkling level of the clothes A, and may further include refresh enhancing means 190 that may remove or lower the contamination level or the wrinkling level of the clothing.

For example, the sensor 160 may include a chemical sensor 161 that senses an air contamination level inside the clothing treating apparatus 100, or an inside camera 162 that may image the clothing or the space in which the clothing is accommodated. The refreshing-related main controller 180 may be configured to calculate a contamination level or the wrinkling level based on the state of the clothing receiving space as detected by the sensor 160 and determine a suitable course or option among the arbitrary courses or options, based on the contamination level or the wrinkling level.

Further, the refreshing-related main controller 180 may transmit information about the contamination level or the wrinkling level to the washing machine 300 via the refreshing-related communication module 260 when the contamination level or the wrinkling level is higher than or equal to a reference value. The refreshing-related communication module 260 may transmit information on the contamination level or the wrinkling level to the server 600 or the washing machine 300.

Further, the refreshing-related main controller 180 may display recommendation that the clothing should be washed in the washing machine 300 on the refreshing-related output interface 140.

The washing machine 300 according to one embodiment of the present disclosure includes a washing-related main storage 380 in which an arbitrary course or option to remove foreign substances from clothing is stored, a washing-related main controller 370 performing one course or option among the arbitrary courses or options, and a washing-related communication module 360 configured to communicate with the external terminal device 400 or the AP 300, and the refreshing-related communication module 260.

The washing-related main controller 370 prevents standby power consumption by cutting off the power supply when the operation of the washing machine 300 is finished or stopped. However, the washing-related main controller 370 may be configured to allow the washing-related communication module 360 to always maintain a state in which power is supplied thereto to maintain the communication state thereof.

The washing machine 300 may include a washing-related input interface 350 for receiving a command to perform the arbitrary course or option, and a washing-related output interface 340 that outputs the state of the washing machine 300. The washing-related input interface 350 and the washing-related output interface 340 may be configured in a similar manner to those of the clothing treating apparatus 100.

The washing-related communication module 360 includes a washing-related communication modem 361 configured to communicate with at least one of the server 600, the AP 500, the external terminal device 400, and the clothing treating apparatus 100, a washing-related communication controller 362 configured to control the washing-related communication modem 361, and a washing-related communication storage 363 that stores information received from the washing-related communication modem 362. The washing-related communication module 360 may be configured to act as a short-range communication module and a long-range communication module as in the external terminal device 400.

As a result, the clothing treating apparatus 100 and the washing machine 300 may be configured to communicate with each other via the refreshing-related communication module 260 and the washing-related communication module 360 or with the external terminal device 400 and the server 600 via the refreshing-related communication module 260 and the washing-related communication module 360. Thus, the washing machine 300 may receive and store information about the contamination level or the wrinkling level of the clothes in advance via the washing-related communication module 360. Then, the washing-related main controller 370 may determine an appropriate course or option based on the contamination level or the wrinkling level. In another example, the server 600 may pre-determine a course or option suitable for the clothing state and deliver the same to the washing-related communication module 360.

In one example, the on-line system according to one embodiment of the present disclosure may further include the fitting unit 200 that collects the user's body information BI, the user's stored clothing information AI, the indoor background information DI, etc. and provides the virtual fitting service to the user.

As described above, the fitting unit 200 may be disposed on the clothing treating apparatus 100, and may be configured to communicate with the refreshing-related communication module 260 or the components of the clothing treating apparatus 100.

In one example, the refreshing-related main storage 170 may store an utterance list that matches a user's voice command and the button 153 of the refreshing-related input interface 150 with each other. When the refreshing-related input interface 150 receives a voice command via the microphone 153, the refreshing-related input interface 150 may be configured to compare the voice command with the utterance list with each other and select a command based the comparing result and then send the selected command to the refreshing-related main controller 180 or the communication module 260.

When the refreshing-related main controller 180 may directly receive and process the command, the refreshing-related main controller 180 may operate the components of the clothing treating apparatus 100 according to the command. Further, when the communication module 260 receives the command, the module 260 may transmit the command to the server 600 to request transmission of a command to operate the components of the clothing treating apparatus 100 from the server 600. The server 600 may be configured to allow the clothing treating apparatus 100 to execute the corresponding command via the communication module 260.

Figure 4:
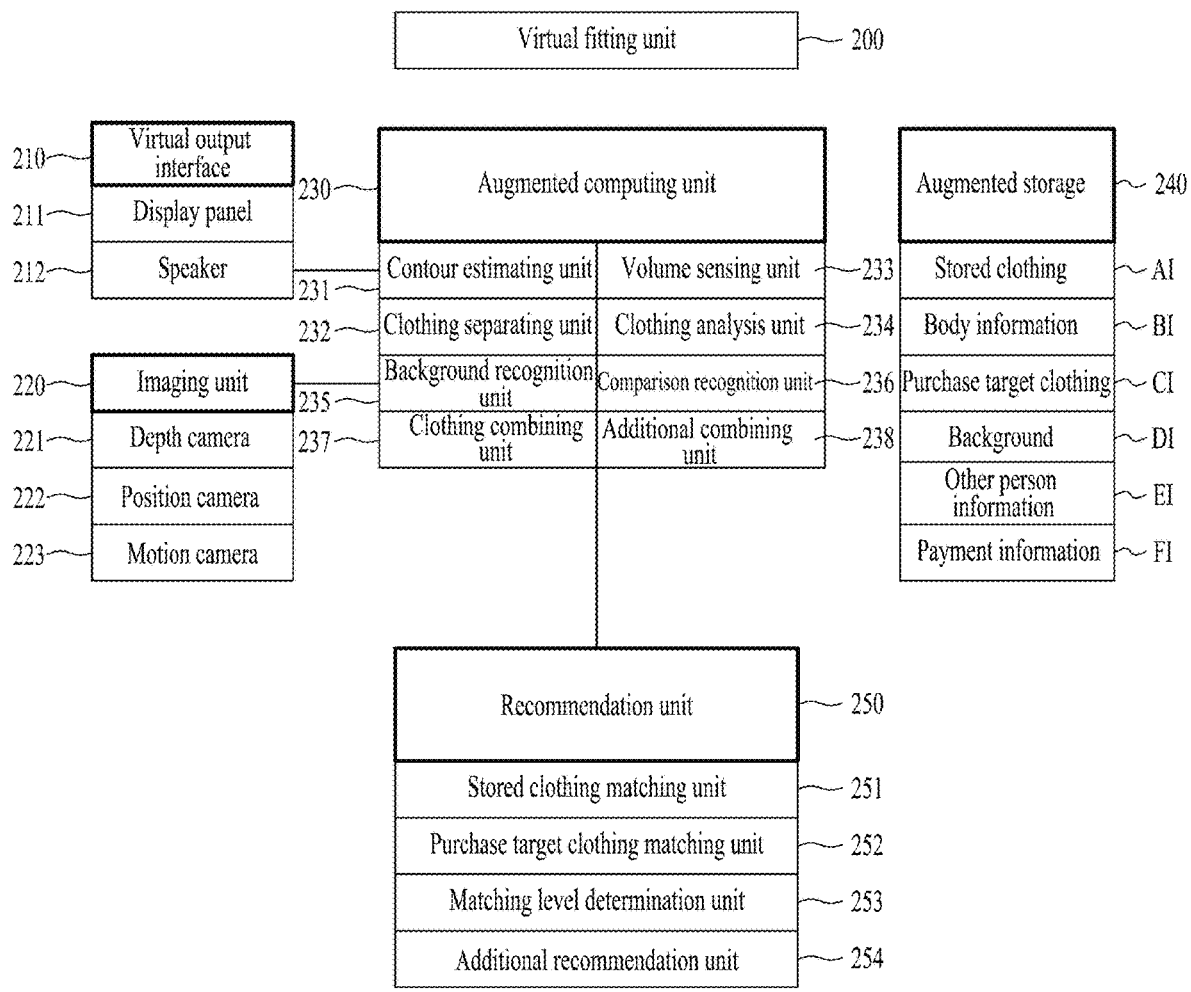
FIG. 4 shows a configuration of a fitting unit that may register and recommend clothing in the on-line system according to the present disclosure.

Hereinafter, a configuration and a function of the fitting unit 200 according to one embodiment of the present disclosure will be described with reference to FIG. 4.

The fitting unit 200 may include an imaging unit 220 that images the user's body or the clothing possessed by the user, and a virtual output interface 210 that may display the user or the clothing captured by the imaging unit 220.

The imaging unit 220 may include at least one of a depth camera 221 that may image not only the shape of the user's body or the stored clothing A, but also an area and a volume thereof, a position camera 222 that detects the change of the user's position and the position of the clothing, and a motion cameras 223 that may detect changes in motion or clothing of the user. The depth camera 221, the position camera 222, and the motion camera 223 may be disposed individually, or may be integrated into one camera or may be integrated with the camera 153 which acts as the refreshing-related input interface 150 of the clothing treating apparatus 100. For example, the depth camera 221 may be embodied as a camera that calculates a depth value of each pixel of an image. This calculation may not be performed in a 2D camera. The depth camera 221 may include a plurality of the depth cameras.

As a result, the imaging unit 220 may be configured to calculate the depth of the pixel of the user or the clothing imaged via two or more camera modules to acquire the 3D image.

In one example, the imaging unit 220 may also perform a user identification function. For example, the imaging unit 220 may be configured to identify a specific user and another user. The imaging unit 220 may be configured to recognize the iris of each of a plurality of the users or to detect one of a face, a body feature, and a shape thereof to identify the plurality of the users.

The fitting unit 200 may further include an augmented computing unit 230 that extracts and recognizes the user's body information or clothing information from the image captured with the imaging unit 220.

The augmented computing unit 230 may include a contour estimating unit 231 that extracts an appearance or a contour of the user's body or clothing from the image captured by the imaging unit 220, a clothing separating unit 232 that separates clothing from the user's body, a volume sensing unit 233 that computes the user's body volume or clothing volume, and a clothing analyzing unit 234 that recognizes the material, color, shape, and type of the extracted clothing. Thus, the augmented computing unit 230 may acquire the clothing information AI including the shape, color, material, brand, and volume of the clothing and the body information BI including the user's height, volume, length of each joint, and skin color from the image captured by the imaging unit 220.

The imaging unit 220 may image not only the user or clothing, but also an indoor space where the user is absent. The augmented computing unit 230 may include a background recognition unit 235 that recognizes the space as a basic background. The background recognition unit 235 may be used when the contour estimating unit 231 recognizes the contour or the clothing separating unit 232 separates clothing from the user's body, based on a comparing result between the background image and the current captured image. Accordingly, the augmented computing unit 230 may acquire background information DI about the background in which no user exists.

In one example, the fitting unit 200 may include an augmented storage 240 in which the augmented computing unit 230 stores information analyzed from the image captured by the imaging unit 220.

The augmented storage 240 may store therein all information extracted by the augmented computing unit 230 from the image captured by the imaging unit 220. For example, the clothing information AI, the body information BI of the user, and the background information DI which are extracted and acquired by the augmented storage 240 from the user image and the plurality of clothing images as imaged by the imaging unit 200 may be stored in the database. In another example, the background information DI may include another background received from the refreshing-related communication module 260. Another background may include a background provided by the server 600 and a background provided by the external terminal device 400.

Further, the augmented storage 240 may also store therein the other person information EI including another user other than the user or a person who does not use the clothing treating apparatus 100 other than the user according to the user's selection. The other person information EI may include at least one of body information of the other person, clothing information preferred by the other person, and wearing information about a state in which the other person wears specific clothing. The other person information EI may be obtained by the augmented computing unit 230 analyzing the image captured by the imaging unit 220 or the image received by the refreshing-related communication module 260.

Further, the augmented storage 240 may further store therein the payment information FI used for purchasing clothing that the user does not own. For example, the payment information FI may include external seller's sales information, user's bankbook information, user's payment card information, user's authentication information, and the like.

The augmented computing unit 230 may further include a comparison recognition unit 236 configured to compare information stored in the augmented storage 240 with information currently imaged by the imaging unit 220 and recognize differences and similarities therebetween. For example, the comparison recognition unit 236 may detect a change in the user's body or a change in the clothing worn on the user. The comparison recognition unit 236 may recognize the user's body ratio or face, and accurately recognize a specific user based on a comparing result between a previously captured image and a currently captured image and may recognize changes in the body of the specific user or clothing worn on the specific user.

In one example, the comparison recognition unit 236 may compare and analyze the stored clothing information AI to grasp the user's preference. The user's preference may include at least one of information on a type, style, size, color, material, brand, and fashion trend (such as office look, see-through look), and the like of the user's preferred clothing.

In other words, the type, style, size, material, and color of clothes that the user prefers among various types, materials, and colors of clothes may be stored, as the preferences, in the augmented storage 240. The stored clothing information AI may be associated with preference levels. This preference information may be used to extract clothing suitable for the user from the stored clothing information AI.

In one example, the augmented storage 240 may store therein not only the stored clothing of the specific user as imaged by the imaging unit 220, but also purchase target clothing information CI that may be purchased by the user and received from the refreshing-related communication module 260. The purchase target clothing information CI may include material, shape, volume information, etc. of clothing of a brand preferred by the user, clothing suitable for the user's body information B, and clothing provided by the seller and suitable for the user's payment information FI.

The fitting unit 200 may include a recommendation unit 250 that may apply, to the recommendation algorithm, at least one of the information stored in the augmented storage 240, the information obtained by the augmented computing unit 230 analyzing an image currently captured by the imaging unit 220, and the weather information, the schedule information, the fashion information, the purchase target clothing information, etc. as received via the refreshing-related communication module 260 and may output the clothing suitable for the user.

The recommendation unit 250 may be configured to directly execute the recommendation algorithm to recommend the suitable clothing to the user, or to receive the execution result of the recommendation algorithm from the server 600 to recommend the suitable clothing to the user.

When the recommendation unit 250 directly executes the recommendation algorithm, the recommendation unit 250 may include a stored clothing matching unit 251 which inputs the current state information and the stored clothing information AI into the recommendation algorithm to determine the suitable clothing, a purchase target clothing matching unit 252 that inputs the current state information and the purchase target clothing information CI into the recommendation algorithm to determines the suitable clothing, and a matching level determination unit 253 that provides a matching level to each of the stored clothing matching unit 251 and the purchase target clothing matching unit 252.

The recommendation unit 250 may recommend the appropriate clothing to the user from the stored clothing A and the purchase target clothing CI via the stored clothing matching unit 251 and the purchase target clothing matching unit 252, respectively.

The recommendation unit 250 may first compute the matching level of the stored clothing information AI to recommend the suitable clothing to the user. When the matching level is lower than a preset value, the recommendation unit 250 may compute the matching level of the purchase target clothing information CI to recommend suitable clothing to the user. As a result, the recommendation unit 250 may actively utilize the clothing A that the user possesses, and thus may prevent unnecessary purchases.

The matching level determination unit 253 may include database that stores therein information on a matching level at which various clothes match each other. The database may be received from the server 600. The matching level determination unit 253 may create database including information on the matching level between various products, including a level at which the top and bottom of specific styles match each other, a level at which specific colored clothes match each other, a level at which miscellaneous accessories such as bags, scarfs and sunglasses match specific style clothing. Alternatively, the matching level may be a computed value as empirically extracted when the database is subject to a deep learning process in the server 600.

Hereinafter, one embodiment for calculating the matching level will be described. One embodiment to be described later may be applied to the database creation process, and may be applied to a process in which the database is subject to the deep learning process.

Basically, the top matches the bottom. Specifically, the shirt or blouse among the top matches the jacket or cardigan, etc. The jacket may match a coat. Further, miscellaneous goods such as bags, shoes, and scarf may match a state in which the user wears both the top and bottom. Accessories such as sunglasses, necklaces, and earrings may match a state in which the user wears both the top and bottom.

Regarding a product for a layered look, the skirt and leggings as the bottom may match each other. However, long jeans and long cotton pants as the bottom may not match each other. This is because the user does not usually wear both of jeans and cotton pants at the same time.

In one example, even when the top and bottom may basically match each other, the matching level therebetween may vary depending on the type, color, and material of the top and bottom. For example, jeans may not go well with hanbok (Korean traditional clothes). In some cases, clothes of specific colors do not match well with each other. Further, the matching level between the accessories and miscellaneous goods and clothing of various materials and colors may vary according to the color and material of the accessories and miscellaneous goods.

Thus, the matching level refers to information obtained by statistically calculating the levels at which the various products match each other. For example, as described above, jeans and cotton pants may not match each other and the user does not usually wear both of jeans and cotton pants at the same time. Thus, the matching level therebetween is 0.

Whether both products match each other or not may be inferred based on the number of combinations therebetween that may be detected in data. In conclusion, as the matching level between two products is higher, the number of combinations therebetween that may be detected in data may be larger. As the matching level between two products is lower, the number of combinations therebetween that may be detected in data may be smaller.

Thus, the number of combinations therebetween that may be detected in data may be converted into the matching level therebetween. As a result, when the matching level value is higher, the combination therebetween is suitable. When the matching level value is low, the combination therebetween is not suitable.

The recommendation unit 250 may compute the matching levels of the stored clothing and the purchase target clothing, respectively, based on matching level information stored in the matching level determination unit. When there is clothes having a matching level equal to or higher than a reference value among the stored clothing information AI, the recommendation unit 250 may recommend the stored clothes while excluding the purchase target clothing. However, the recommendation unit 250 may be configured to recommend the clothing having the matching level equal to or higher than the reference among the stored clothing information AI.

For example, when jeans are extracted as recommended clothing, the matching level between the recommended clothing and cotton pants belonging to the stored clothing or the purchase target clothing is 0, thereby preventing occurrence of the case where jeans and cotton pants match each other at the same time.

In one example, the matching level determination unit 253 may determine the priority of clothing to be recommended based on the computed preference of the user. For example, when a plurality of clothing have similar matching levels, specific clothing may be selected and recommended from the plurality of clothing, based on the user's preference. As a result, user preferences may be considered among in-fashion clothes, and recommendation reviews may be good.

Further, the matching level determination unit 253 may be configured to compute matching levels of clothes having higher user preference and recommend specific clothing therefrom. As a result, the preference may be prioritized over the fashion trend, such that the user' preferences may be first considered. In one example, the recommendation unit 250 may include an additional recommendation unit 254 which is configured to recommend additional accessories and the like.

The additional recommendation unit 254 may be configured to automatically determine the accessory that is separately requested from the user or whose a matching level increases in the matching level determination unit 253 and to recommend the accessory.

In one example, the fitting unit 200 may further include a virtual output interface 210 that outputs the clothing recommended by the recommendation unit 250 to the user.

The virtual output interface 210 may include a display panel 211 that displays the recommended clothing in a video or image format, and a speaker 212 that may output that the clothing should be purchased using voice.

The clothing may be sized into an actual scale relative to the user's image and may be rendered to the user's image and may be displayed on the display panel 211. That is, a state in which the clothing is worn on the user may be rendered on the user's image. Thus, the user may identify whether the clothing is suitable for the user even without actually wearing the recommended clothing.

The augmented computing unit 250 may include a clothing combination unit 237 that combines the clothing recommended by the recommendation unit 250 with the user's image or avatar. The clothing combination unit 237 may combine clothing information of the recommended clothing with the image of the user captured by the imaging unit 220 to render a state in which the clothing is worn on the user's body. The clothing combination unit 237 may consider the user's body ratio and the clothing ratio when combining the clothing and the body image each other. The clothing combination unit 237 may be configured to display other portions of the clothing according to the movement of the user.

In one example, the augmented computing unit 250 may include an additional combination unit 238 that additionally combines the combination image of the user body and the clothing obtained by the clothing combination unit 237 with accessories recommended by the additional recommendation unit 254.

3D information of the clothing or the accessory as already measured or computed may be stored in the stored clothing information AI and the purchase target clothing information CI. Therefore, the augmented computing unit 230 may compute the state in which the clothing or accessory is worn on the user's actual body size and display the state on the virtual output interface 210.

When the clothing that the user is currently wearing is the bottom, the augmented computing unit 230 may recommend bottom information about the bottom owned by the user (jeans, blue skirt, three-quarter length pants, yam based pans) based on the matching level in the stored clothing information AI or the purchase target clothing information CI. Then, the augmented computing unit 230 may combine the recommended clothing with the user's image to create a virtual fitting image and may display the virtual fitting image on the virtual output interface 210.

As described above, according to embodiments of the present disclosure, the user may directly identify, with his or her own eyes, how well the clothes he/she owns and the recommended clothes match each other.

Hereafter, a structure in which the fitting unit 200 is installed in the clothing treating apparatus 100 will be described.

Figure 5:
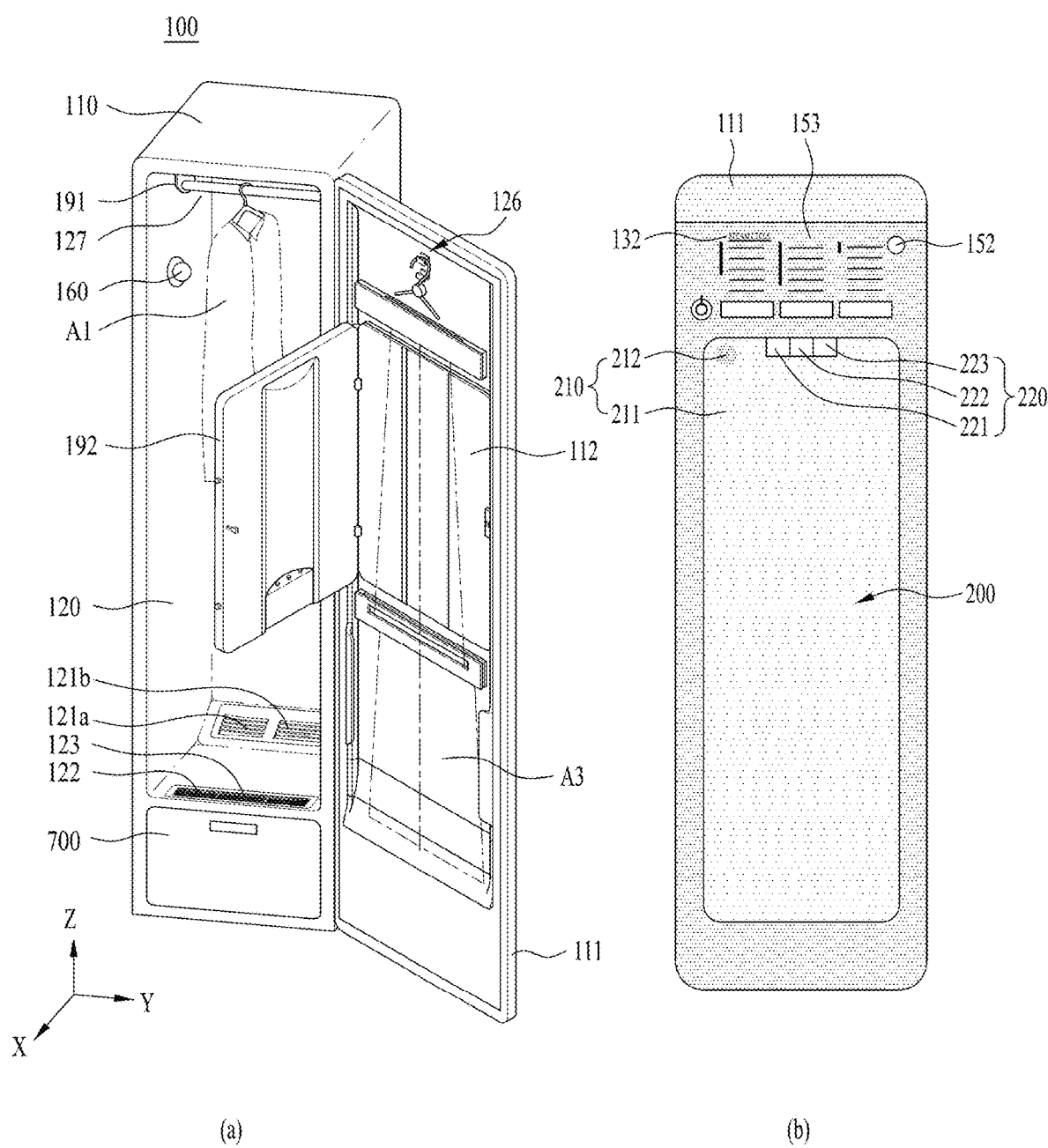
FIG. 5 shows a clothing treating apparatus as one of home appliances in the on-line system according to the present disclosure.

FIG. 5 shows one embodiment of a structure of the clothing treating apparatus 100.

Referring to (a) in FIG. 5, the clothing treating apparatus 100 according to one embodiment of the present disclosure includes a cabinet 110 having a front opening, a door 111 that is pivotably disposed at the cabinet 110 to open and close the opening, an inner casing 120 which is disposed in the cabinet and which provides a clothing receiving space S in which clothes A is accommodated, a hot-air or steam supply 700 communicating with the inner casing 120 to supply at least one of hot-air or steam to the clothing receiving space S, and hanger supports 126 and 127 that are disposed on the inner casing 120 and/or the door 111 to support hangers holding the clothes A inside the clothing receiving space S.

The cabinet 110 may be constructed to define an appearance of the clothing treating apparatus and may have a vertical dimension greater than a horizontal dimension. As a result, the shown overcoat A1 as well as the bottom A3 that extends vertically in an unfold manner may be accommodated in the inner casing 120. Thus, unnecessary wrinkles may not occur in the received clothes A.

The cabinet 110 may be made of a metal material. As long as the cabinet may maintain a strength, the cabinet may be made of a resin material such as reinforced plastic.

The inner casing 120 may be made of a material that is not physically deformed by or chemically reacted with foreign substances released from the clothes A or the hot-air or steam supplied from the supply. For example, the inner casing may be made of a styrene resin series such as ABS and ASA. The inner casing 120 may be constructed to communicate with the hot-air or steam supply 700, so that hot-air or steam is supplied from the hot-air or steam supply 700 to the clothing receiving space S or air is discharged to the hot-air or steam supply 700. To this end, the inner casing 120 may have a plurality of through-holes 121,122, and 123 defined therein communicating with the hot-air or steam supply 700.

In one example, the hot-air or steam supply 700 may be disposed separately from the inner casing 120. The hot-air or steam supply 700 may be disposed under the inner casing 120 to uniformly supply heated air or steam at a relatively low density to the inner casing 120.

In one example, the door 111 may be pivotally coupled to the cabinet 100 and may be constructed to open and close the opening. The door 111 may be constructed to shield a front face of the hot-air or steam supply 700 as well as the inner casing 120. This not only prevents the hot-air or moisture supplied to the inner casing 120 from leaking to an outside, but also prevents heat generated from the hot-air or steam supply 700 from being transferred to the outside.

Since the door 111 is constructed to open and close the front opening of the inner casing 120, an inner peripheral face of the inner casing 120 and an inner face of the door 111 may define the clothing receiving space S.

The hanger support may include a first hanger support 127 constructed to support a hanger holding clothes A inside the inner casing 120, and a second hanger support 126 constructed to support a hanger holding clothes A on the inner face of the door 111.

Hereinafter, description will be made on the assumption that a hanger holding the overcoat A1 is supported on the first hanger support 127 and a hanger holding the bottom A3 is supported on the second hanger support 128.

The first hanger support 127 has a bar shape inside the inner casing 120 so that the hanger holding the overcoat A1 may be supported thereon in the clothing receiving space S. The first hanger support 127 may be disposed on a top face of the inner body 210 or may be disposed on a top of a side face of the inner body 210 so that the hanger holding the overcoat A1 may be supported thereon in the inner casing 120 in a fully unfolded state. The first hanger support 127 on which the hanger holding the clothes A in an unfolded state by its own weight is supported is mounted on the inner casing 120 to evenly expose hot-air or steam supplied from the hot-air or steam supply 700 to the overcoat A1.

The second hanger support 126 may support the hanger holding the bottom A3 on the inner face of the inner casing 120 or a location adjacent to the door 111. As a result, the second hanger support 126 allows one face of the bottom A3 to be in close contact with the inner face of the inner casing 120 or the door 111 to eliminate wrinkling therefrom.

In one example, the clothing treating apparatus 100 according to one embodiment of the present disclosure may further include the refresh enhancing means 190 that maximizes the refresh effect of the clothes A.

The refresh enhancing means 190 may include a vibration generator 191 connected to the first hanger support 127 to vibrate the first hanger support 127, and pressing means 192 disposed under the second hanger support 126 to pressurize the clothing.

The vibration generator 191 may be embodied as a module including a motor, pulley, and a cam to allow the first hanger support 127 to reciprocate in a longitudinal direction or along an arc path. Thus, the hot-air or steam may be evenly supplied to the surface of the overcoat A1 supported on the first hanger support 127, and foreign substances attached to the overcoat A1 may be removed therefrom.

The pressing means 192 may be configured to be pivotally coupled to at least one of the inner casing 120 or the door 111 to press the bottom A3. The pressing means 192 may manually press the bottom A3. The pressing means 192 may have a hinge rotatably coupled to the inner casing 120 or the door 111, etc. to automatically press the bottom A3 using a motor. The door 111 or the inner casing 120 may further include a pressed clothing seat 112 to face-contact the pressing means 192. Each of the pressing means 192 and the pressed clothing seat 112 may have a plate shape. The pressed clothing seat 112 may apply a pressure to the bottom A3 in reaction to a pressing force from the pressing means 192.

Referring to (b) in FIG. 5, the clothing treating apparatus 100 may further include the aforementioned fitting unit 200. The door 111 is disposed at a front face of the cabinet 110 so that the user may easily access the door. Therefore, the refreshing-related input interface 150 and the refreshing-related output interface 140 may be disposed on the exposed surface of the door 111. The virtual output interface 210 and the imaging unit 220 may be further disposed on the exposed surface of the door 111. In another example, the fitting unit 200 may be disposed on another component of the clothing treating apparatus 100.

The virtual output interface 210 may be configured to occupy most of an area of the exposed surface of the door 111. Accordingly, the virtual output interface 210 achieve a mirror-like effect by displaying the same sized image as the user's actual size.

For example, the display panel 221 may be disposed on most of a front face of the door 111. The speaker 212 may be disposed on the exposed surface of the display panel 221 or the door 111.

Further, the imaging unit 220 may be disposed adjacent to the virtual output interface 210. As a result, the imaging unit 220 may recognize the shape of the user and the clothing the user is holding or wearing at an accurate angle. Specifically, the depth camera 221 may be disposed at a level corresponding to the user's eye level. For example, the depth camera 221 may be disposed above the virtual output interface 210. As a result, the imaging unit 220 may image the user at the user's eye level and display the mirror-like user image on the virtual output interface 210.

The position camera 222 and the motion camera 223 may be disposed adjacent to the depth camera 221 such that the three camera may constitute the imaging unit 220 as a module.

The display panel 221 may also serve as the clothing screen 142 in FIG. 2. Further, the clothing screen 142 may be disposed above or on one side of the display panel 221.

In one example, the speaker 212 may also perform the role of the speaker 141 in FIG. 2.

The button 153 or the microphone 152 may be disposed above or on one side of the display panel 221 so as not to screen the display panel 221. In one example, the imaging unit 220 may be embodied as the camera 153 that recognizes a user's motion.

Figure 6:
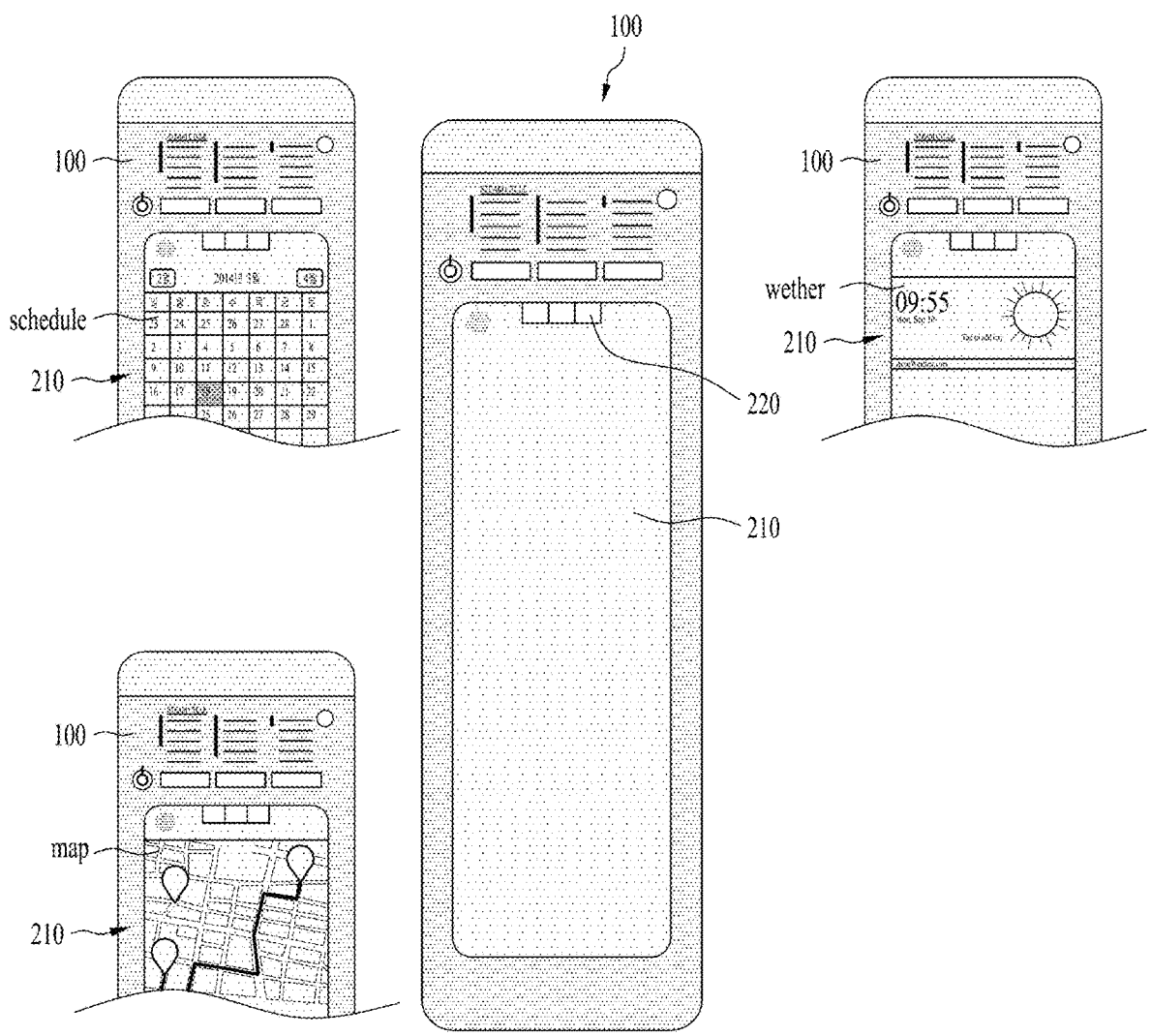
FIG. 6 shows a function of a virtual output interface of the clothing treating apparatus of the on-line system according to the present disclosure.

FIG. 6 shows an embodiment of the display panel 221 of the clothing treating apparatus 100.

As described above, the clothing treating apparatus 100 is configured to communicate with the server 600 and the external terminal device 400 via the communication module 260. Accordingly, the clothing treating apparatus 100 may be configured to receive information on a user's schedule or weather, and location information of a specific clothing seller from the server 600 or the external terminal device 400.

The refreshing-related input interface 150 may be configured to receive a command requesting a user's schedule, weather information, and location information via the specific button 153 or the microphone 151. The command may include a voice command.

When the command has been received, the refreshing-related main controller 180 may request the communication module 260 to receive the user's schedule, weather information, or location information from the server 600 or the external terminal device 400.

When the communication module 260 has received the requested information, the refreshing-related main controller 180 may be configured to control the virtual output interface 210 to display the requested information such as the user's schedule, weather information, and location information thereon.

As a result, even when the user is spaced from the clothing treating apparatus 100, the user may utilize the function or service provided by the clothing treating apparatus 100 using the voice command. Further, the user may request necessary information and visually identify the requested information using the clothing treating apparatus 100 having a relatively wide display panel.

Hereinafter, a specific embodiment in which the on-line system according to one embodiment of the present disclosure obtains the user's body information, the stored clothing information, and the background information of the user and recommends customized clothing based on the obtained information will be described.

Figure 7:
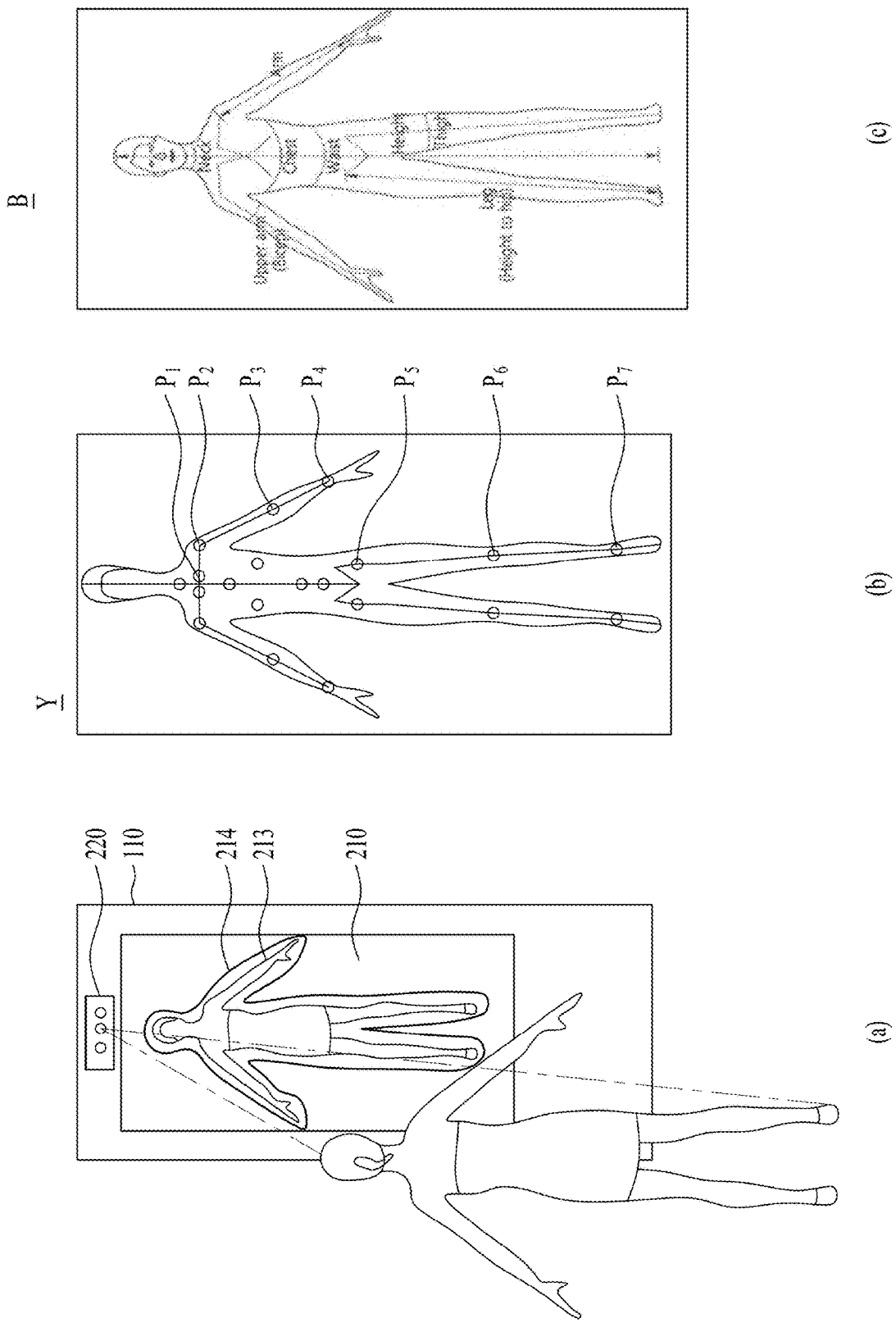
FIG. 7 shows a process of collecting and registering user's body information in the on-line system according to the present disclosure.

FIG. 7 shows an embodiment in which the clothing treating apparatus 100 of the on-line system according to one embodiment of the present disclosure obtains body information BI by imaging the user body.

The on-line system according to one embodiment of the present disclosure needs to acquire user's accurate body information in order to provide virtual fitting [Augmented Reality Fitting (AR Fitting), Virtual Reality Fitting (VR Fitting)] to the user. This is because the more accurate the user's body information, the higher the accuracy of virtual fitting.

Referring to (a) in FIG. 7, the user may be positioned in front of the clothing treating apparatus 100 to allow his or her body information to be captured. The user may be in a situation in which the user inputs a command for inputting the body information to the refreshing-related input interface 150.

When the clothing treating apparatus 100 receives the command to input the body information, the imaging unit 220 may image the user body. The image captured by the imaging unit 220 may be transferred to the augmented computing unit 230, and may be displayed in real time on the virtual output interface 210.

At the same time, the imaging unit 220 may recognize the identity of the imaged user. For example, one of the iris, face, and body information of the specific user as imaged may be recognized and stored in the augmented storage. Accordingly, the body information of the specific user and the body information of other the user may be stored therein in a distinguished manner. The user's body image 213 imaged by the imaging unit 220 may be displayed on the virtual output interface 210. The body image 213 may be an image itself imaged by the imaging unit 220, or may be an avatar image processed with the augmented computing unit 230.

A guide-line 214 may be displayed on the virtual output interface 210.

The guide-line 214 may refer to a line that is displayed to guide the user's body so that the user's body information BI may be accurately acquired. For example, the guide-line 214 may be a line that guides the user to maintain a state in which arms and legs are stretched out while the user stands in front of the apparatus 100.

Further, the guide-line 214 may refer to a line for guiding the user to be positioned in a location where the user's body information may be accurately measured. The user may adjust the distance from the user to the imaging unit 220 so that his body is accurately contained in a region defined by the guide-line 214. This allows the imaging unit 220 to image the user's whole body at an optimal distance and deliver the image to the augmented computing unit 230.

The guide-line 214 may vary frequently. As a result, the imaging unit 220 may image the user's motion and at the same time, image the entire user body including the front, rear, left and right portions. Since the imaging unit 220 includes the depth camera 221, the imaging unit 220 may accurately image the volume or texture of the user's body.

Referring to (b) in FIG. 7, the augmented computing unit 230 may accurately recognize portions of the user's body based on the image captured by the imaging unit 220. For example, the contour estimating unit 231 may accurately extract a contour Y of the user body from the image captured by the imaging unit 220.

Further, the augmented computing unit 230 may analyze the user's motion based on the sensing result from the motion camera 221 of the imaging unit 220, so that the user's main joint positions may be identified by the augmented computing unit 230. The augmented computing unit 230 may store therein an algorithm that matches major joints of the human body with the image captured by the imaging unit.

For example, the contour estimating unit 231 may recognize a major joint from the user's contour Y. The contour estimating unit 231 may locate a neck joint P1 based on the movement of the user's head and chest, and may locate a shoulder joint P2 based on the movement of the user's arm and chest. Further, the contour estimating unit 231 may grasp a position of each of an elbow joint P3 and a wrist joint P4 based on the movement of the arm and may grasp a position of each of a hip joint P5, a knee joint P6, and an ankle P7 based on the movement of the legs.

Referring to (c) FIG. 7, the augmented computing unit 230 may determine the length between the joints of the user based on the determined positions of the joints. For example, the volume sensing unit 232 may calculate and measure the length and the volume of the user's body based on the contour and the joint extracted by the contour estimating unit 231. That is, the volume sensing unit 232 may accurately recognize the length and the volume of each of the user's head, neck, arms, legs, and waist.

Using the volume sensing unit 232, the specific body information BI may be obtained by accurately detecting the user's total height, a length between specific joints, and a volume between specific joints. The body information BI may be stored in the augmented storage 240. Afterwards, the comparison recognition unit 236 may use the body information BI to identify the change in the body information BI or to extract the stored clothing information AI when the clothing is worn on the user.

In another example, the augmented computing unit 230 may recognize the user's skin color or eye color, iris, face, beard, hairstyle, etc. from the image measured by the imaging unit 220 and include the same in the body information BI.

Figure 8:
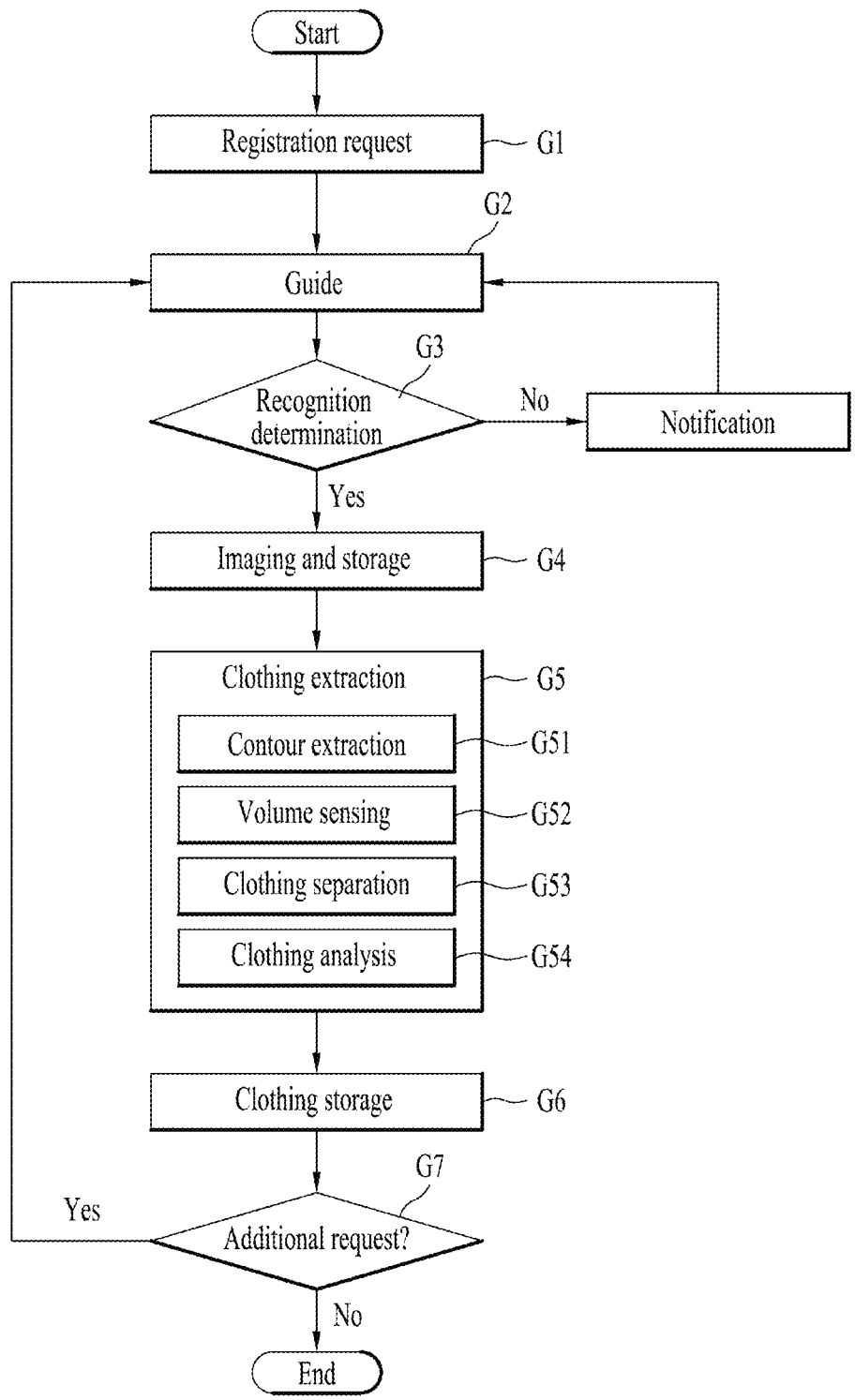
FIG. 8 shows a process of registering the user's stored clothing in the on-line system according to the present disclosure.
Figure 9:
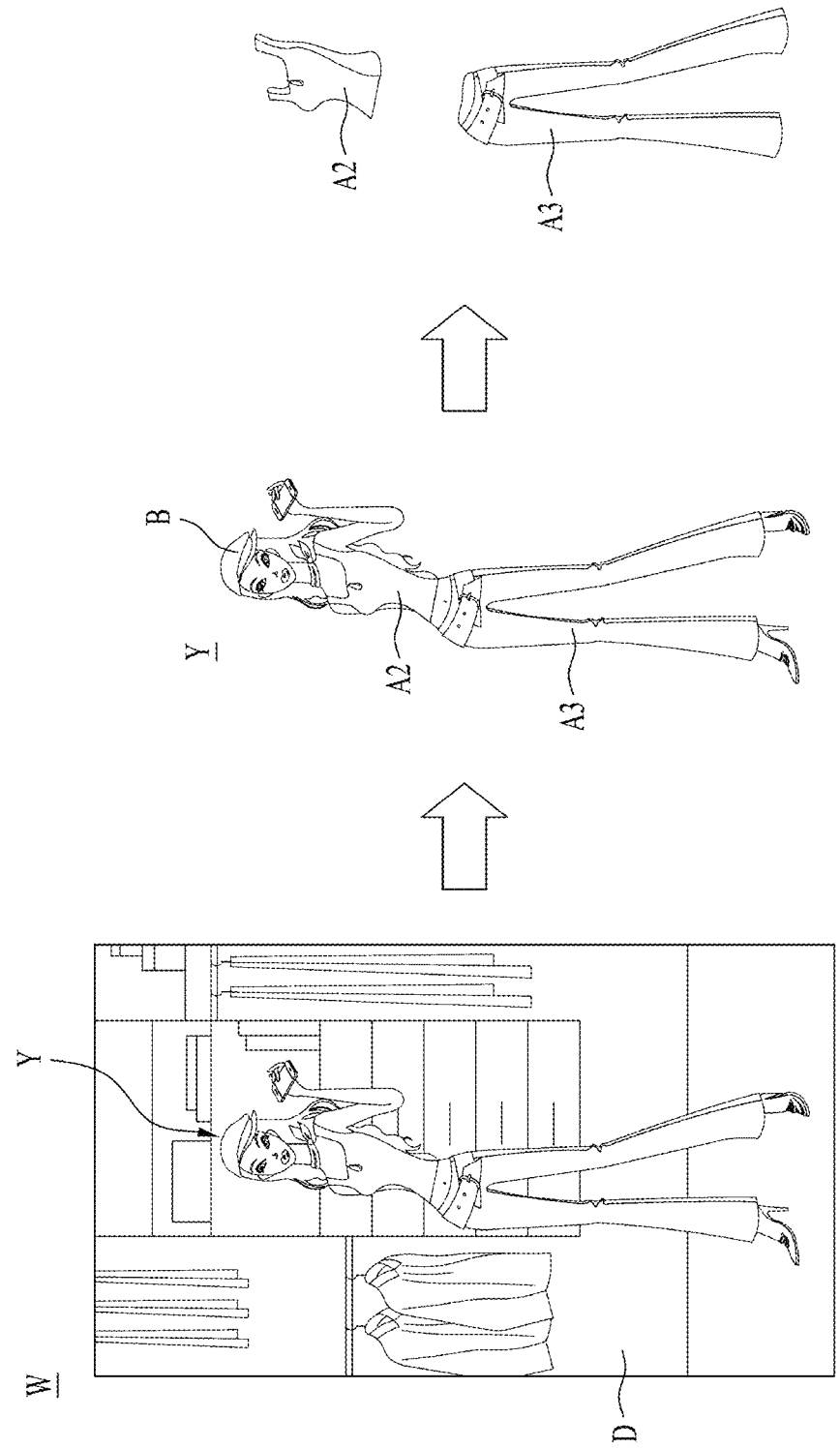
FIG. 9 shows one embodiment in which the process of FIG. 8 is implemented.
Figure 10:
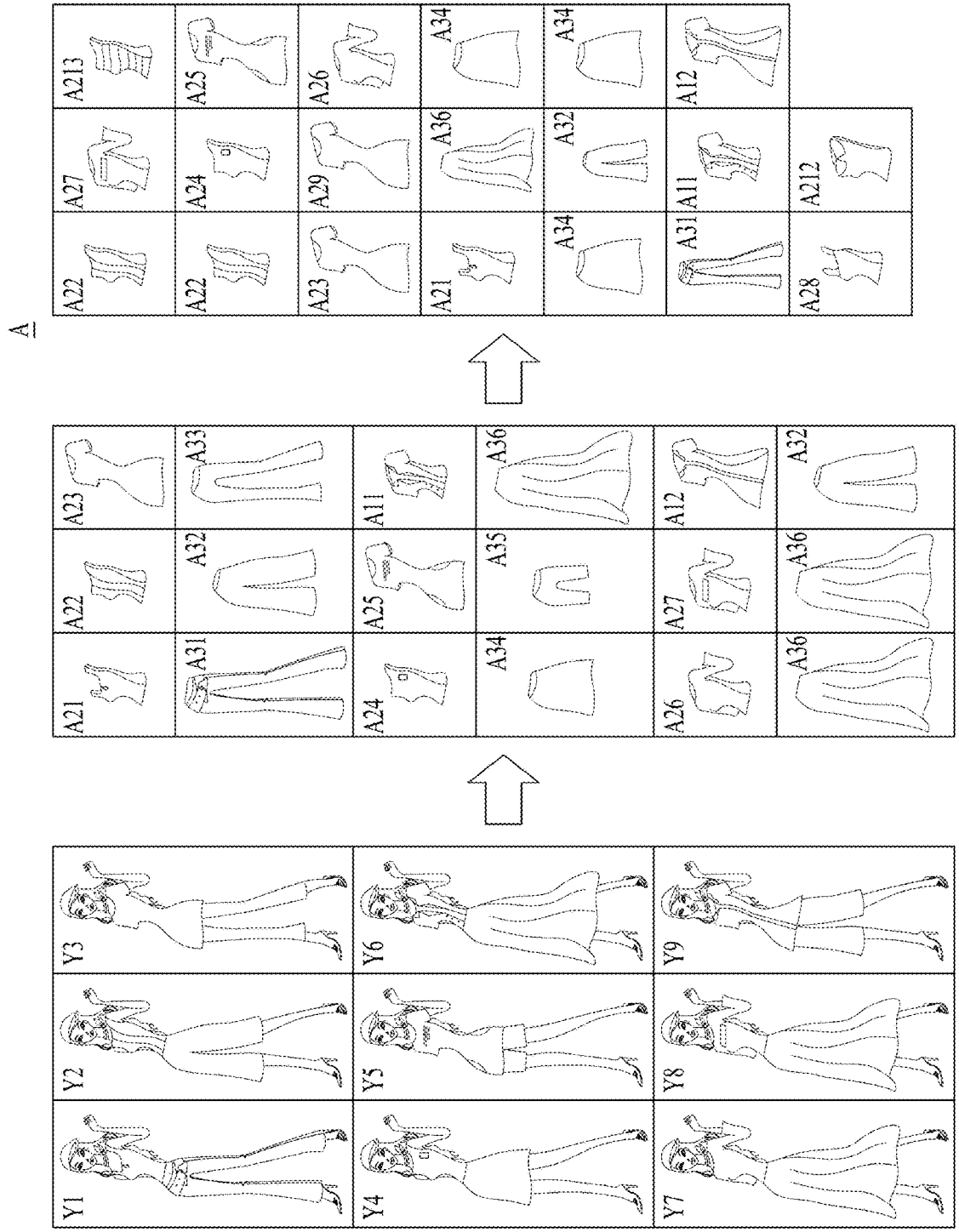
FIG. 10 shows a result of performing the process of FIG. 9 multiple times.

FIG. 8 to FIG. 10 show an embodiment in which the on-line system according to one embodiment of the present disclosure extracts and recognizes the user's clothing information AI.

In order for the on-line system according to one embodiment of the present disclosure to recommend the user's stored clothing A via the fitting unit 200, specific information about the stored clothing A must be present and registered. When the information of the stored clothing A is not provided as a direct file to the seller or the user, the online system according to one embodiment of the present disclosure may directly image the user's stored clothing A and extract and store the stored clothing information AI.

The on-line system according to one embodiment of the present disclosure may execute a registration requesting operation G1 of requesting the user to store the information of the clothing A that the user possesses in the on-line system. In the registration requesting operation G1, the user may receive a command for the user to store the information about the clothing that he or she possesses into the fitting unit 200 via the refreshing-related input interface 150 of the clothing treating apparatus 100.

The clothing treating apparatus 100 may be used to register the clothing, and thus may correspond to the clothing registration apparatus.

The command may be received when the user directly inputs the button 152 for requesting the registration of clothing in the refreshing-related input interface 150. Alternatively, the command may be received through the user's voice command from the microphone 151 of the refreshing-related input interface 150.

When the registration requesting operation G1 is performed, the on-line system according to one embodiment of the present disclosure may execute a guiding operation G2 to guide the registration of the clothing by the user. The guiding operation G2 may allow the user to be positioned in front of the imaging unit 220 in a state in which the clothing is worn on or held by the user. In the guiding operation G2, a guide-line 214 or guiding words may be displayed on the virtual output interface 210 to guide the user to be located at an optimal location where the imaging unit 220 images the clothing A for registration of the clothing.

The on-line system according to one embodiment of the present disclosure may perform a determining operation G3 to check whether the imaging unit 220 may recognize the clothing A worn on or held by the user.

The determining operation G3 may check whether the approximate shape of the clothing may be determined, rather than checking whether the clothing size or volume may be accurately recognized. For example, the determining operation G3 may check whether the augmented computing unit 230 may approximately specify the user or the clothing via the imaging unit 220.

Further, the determining operation G3 may identify who is registering the clothing. That is, the determining operation G3 identify whether a specific user registers the clothing, or the specific user and another user register the clothing. As a result, the clothing to be registered and a person to wear the clothing may match each other and then the matching result may be stored in the storage.

The on-line system according to one embodiment of the present disclosure may execute a notification operation G3-1 indicating that the registration of the clothing is impossible when the augmented computing unit 230 may not specify the user or the clothing.

When the augmented computing unit 230 may not specify the user, the user's identity may not be specified. Further, when the augmented computing unit 230 may not specify the clothing, the clothing may not be accurately recognized.

The notification operation G3-1 may display words indicating a state that the registration of the clothing is impossible or words requesting that the location of the user is changed such that the user body is contained in a region defined by the guide-line 214, on the display panel 211. Further, a voice corresponding to the words may be output through the speaker 212. After the notification operation G3-1, the guiding operation G2 may be repeated.

Even in this case, when the user or the clothing may not be specified, words requesting to register the user may be displayed on the display panel 211. This may correspond to the execution of the control method in FIG. 7.

When the recognition determining operation G3 determines that the user or clothing may be specified, the on-line system according to one embodiment of the present disclosure may execute an imaging and storing operation G4 of imaging the user or the clothing using the imaging unit 220, and transferring the captured image to the augmented computing unit 230 or the augmented storage 240.

When the image and storing operation G4 is completed, the on-line system according to one embodiment of the present disclosure may perform a clothing extraction operation G5 in which the augmented computing unit 230 extracts clothing from the captured image to obtain the clothing information AI.

The clothing extraction operation G5 may include a contour extraction operation G51 in which the contour estimating unit 231 extracts the contour of the user wearing the clothing or the user holding the clothing from the image captured by the imaging unit 220, a volume sensing operation G52 in which the volume sensing unit 233 detects the volume of the extracted contour based on the information provided by the depth camera 221, a clothing separation operation G53 where the clothing separating unit 232 extracts only the clothing by removing the image or the contour corresponding to the user's body from the contour of the user wearing the clothing or the contour of the user who holds the clothing, and a clothing analysis operation G54 in which the clothing analyzing unit 234 analyzes the type, shape, color, material, brand, size, volume, etc. of the extracted clothing to obtain the clothing information AI.

The clothing analyzing unit 234 may analyze the state of the clothing while applying the separated clothing to a clothing classification program obtained by statistically analyzing big data of the clothing. In the clothing classification program, a plurality of clothing may be classified into various categories based on a type, shape, material, color, and brand of the clothing. The clothing classification program may match specific clothing to the category to analyze the type, shape, material, shape, color, brand, etc. of the specific clothing.

The clothing classification program may be provided from the server 600, and may be received or updated via the refreshing-related communication module 260 and stored in the augmented storage 240.

When the clothing has been analyzed in the clothing extraction operation G5, a clothing storage operation G6 of storing the clothing information AI about the clothing in the augmented storage 240 may be performed. The clothing storage operation G6 may store the clothing that the user wants to register into the database.

In one example, the clothing storage operation G6 may match the registered clothing with the user who has requested the registration of the clothing and store the matching result. This is intended to accurately identify a person who is to wear the clothing and use the identification result as data for the recommendation of the suitable clothing.

The on-line system according to one embodiment of the present disclosure may perform an additional requesting operation G7 of detecting reception of a command to instruct the user to register additional clothing into the on-line system according to one embodiment of the present disclosure. When the additional requesting operation G7 is performed, the guiding operation G2 is performed, so that clothing information AI about new clothing may be stored in the augmented storage 240. When an active command not to perform the additional requesting operation G7 is detected or when a certain time duration has elapsed, the registering of the clothing may be terminated.

As a result, the user may directly register the clothing information about the clothing whose clothing information is not provided from the seller to the on-line system, thereby storing the clothing information AI about the stored clothing that the user possesses into the database. Therefore, the on-line system according to one embodiment of the present disclosure may recommend the clothing suitable for the user based on the clothing information AI to the user.

FIG. 9 shows an actual implementation of the control method of FIG. 8.

The clothing treating apparatus 100 according to one embodiment of the present disclosure receives a command to register the clothing from the user, and thus the registration requesting operation G1 may be performed.

Thereafter, the guiding operation G2 in which the clothing treating apparatus 100 according to one embodiment of the present disclosure displays the guiding words and guide-lines on the virtual output interface 210 may be performed. While the user is wearing the clothing, the user may be located in front of the imaging unit 220.

The recognition determining operation G3 checks whether the augmented computing unit 230 is capable of specifying the user and clothing, using the imaging unit 220. In this connection, the user may be compared with user data stored in the storage, and whether the user as imaged is a specific user or another user may be determined based on the comparing result. When the user is identified as the specific user, the imaging and storing operation G4 may be performed to image the specific user wearing clothing with the imaging unit 220.

In an entire image W imaged by the imaging unit 220, the background D where the user is located and the contour Y of the user wearing clothing are present.

The contour extraction operation G51 in which the augmented computing unit 230 extracts the contour Y of the user wearing the clothing from the entire image W may be performed. For example, the contour estimating unit 231 may extract the contour Y of the user wearing clothing from the entire image W.

Specifically, the contour estimating unit 231 may accurately recognize and extract the contour Y based on a comparing result between the background information DI pre-stored in the augmented storage 240 and the entire image W. For example, the contour estimating unit 231 may compare the user image with the background image itself and extract an image additionally contained in the background image based on the comparing result. In other words, the background information DI may be usually imaged by the clothing treating apparatus and stored therein. Upon receiving a command to store the background, the background information DI may be pre-stored in the augmented storage 240.

When the contour extraction operation G51 is completed, the volume sensing operation G51 in which the volume sensing unit 233 computes the volume of the contour Y may be performed. The volume sensing unit 233 may acquire volume information using the depth camera 221. When necessary, the display panel 211 may be used to allow the user to rotate or change a position thereof to obtain the 3D information.

The clothing separation operation G53 may be performed in which the clothing separating unit 232 separates the clothing from the user's body based on the contour Y. The clothing separating unit 232 may detect a separation line between the user's body B and the clothing A and separate the clothing A based on the separation line. Alternatively, the clothing separating unit 232 may remove the body B from the contour Y based on the user's body information BI to separate the clothing A from the image.

The clothing separating unit 232 may separate the clothing from the body by extracting portions with colors different from the user's skin color. Further, the clothing separating unit 232 may detect a separation line on the separated clothing image and separate clothing along the line, based on the type of the clothing.

The clothing analysis operation G54 in which the clothing analyzing unit 234 analyzes and recognizes the types of the clothing A may be performed.

When the clothing A is composed of the top A2 and the bottom A3, the clothing analyzing unit 234 may separate the top A2 and the bottom A3 from the entire separated clothing A.

The volume sensing unit 233 may accurately compute the size, area and volume of the separated clothing A. When the size, area, and volume of the clothing are computed by the volume sensing unit 233, the clothing analyzing unit 234 may analyze the type, material, shape, and color of the separated clothing A.

For example, the clothing analyzing unit 234 may input the type, material, color, and shape of the clothing A into the clothing classification program to recognize that the clothing is composed of the top A1 and the bottom A2. Then, using the clothing classification program, the clothing analyzing unit 234 may recognize that the top A1 is a white cotton sleeveless T-shirt, and the bottom A2 is blue jeans.

The clothing storage operation G6 may be executed in which the clothing analyzing unit 234 stores the clothing information AI corresponding to types, materials, colors, shapes, sizes, and volumes of the top A1 and bottom A2 along with identification numbers thereof into the augmented storage 240. In the clothing storage operation G6, the brand of the clothing may be recognized and stored. When the brand is not indicated on the clothing, the brand may be stored via an user input.

Unlike shown, the user may request the registration of the clothing in a state in which the user is not wearing but holding the clothing by hand. In this case, after the imaging unit 220 images the user's entire image, the augmented computing unit 230 may separate the user's body and the clothing from each other in the entire image W, and then the clothing analyzing unit 234 may analyze the type, material, shape, color, and brand of the separated clothing. When the user grips a plurality of clothing, the clothing separating unit 232 may separate each of the clothing from the user's body to extract each of the clothing therefrom.

FIG. 10 shows an embodiment in which the user repeatedly performs the additional requesting operation G7 or executes the registration requesting operation G1 multiple times to obtain the stored clothing information AI about the stored clothing.

In the registration requesting operation G1 or the additional requesting operation G7, the user may request the registration of the clothing in a state in which the user is wearing various clothing among a plurality of tops A2 or bottoms A3 and overcoats A1. The plurality of clothing may include yellow blue-jacket A11, black wool coat A12, blue sleeveless cotton T-shirt A21, striped sleeveless acrylic T-shirt A22, sky blue cotton dress A23, red sleeveless blouse A24, yellow silk dress A25, man-to-man green T-shirt A26, long-sleeved yellow cotton T-shirt A27, top underwear A28, sleeveless pink blouse A212, jeans A31, black three-quarter length pants A32, beige cotton pants A33, blue tennis skirt A34, black laggings A35, and yellow cancan skirt A36.

The imaging unit 220 may image the user wearing the clothing multiple times. The augmented computing unit 230 may extract a plurality of contours from the image.

For example, in a state in which the user wears the clothing 9 times, the user may request the registration of the clothing in the on-line system according to one embodiment of the present disclosure. The imaging unit 220 may image the user's entire image W 9 times, and the contour estimating unit 231 may extract 9 contours Y1 to Y9.

The clothing separating unit 232 may separate and extract the clothing from the contours Y1 to Y9. The clothing separating unit 232 may extract the plurality of overcoats A1, tops A2, and bottoms A3 from the contours Y1 to Y9.

The clothing analyzing unit 234 may analyze and identify the plurality of overcoats A1, tops A2, and bottoms A3, respectively. Therefore, the clothing analyzing unit 234 may determine whether the same clothing has been imaged in a duplicate manner.

The clothing analyzing unit 234 may recognize the size, shape, and volume of each of the plurality of clothing. Further, the clothing analyzing unit 234 may recognize and store the type of each of the plurality of clothing in the augmented storage 240. Further, the clothing analyzing unit 234 may classify the blue jacket A11 and the black coat A12 into the overcoat A1, and may store the classification result along with unique identification numbers thereof into the augmented storage 240.

The clothing analyzing unit 234 may classify a black fur coat A12, blue sleeveless cotton t-shirt A21, striped sleeveless acrylic T-shirt A22, light blue cotton dress A23, red sleeveless blouse A24, yellow silk dress A25, man-to-man green T-shirt A26, long-sleeved yellow cotton T-shirt A27, top underwear A28, sleeveless pink blouse A212 into the top A2, and may store the classification result along with unique identification numbers thereof into the augmented storage 240.

The clothing analyzing unit 234 may classify jeans A31, black three-quarter length pants A32, beige cotton pants A33, blue H skirt A34, black laggings A35, and yellow cancan skirt A36 into the bottom A3, and may store the classification result along with unique identification numbers thereof into the augmented storage 240.

When the clothing has a brand marked on an outer face thereof, the clothing analyzing unit 234 may recognize and store the brand in the augmented storage 240.

Accordingly, the augmented storage 240 may store therein the stored clothing information AI about the stored clothing, including shapes, materials, sizes, volumes, brands, etc. of the plurality of overcoats, tops, and bottom in a database format.

Figure 11:
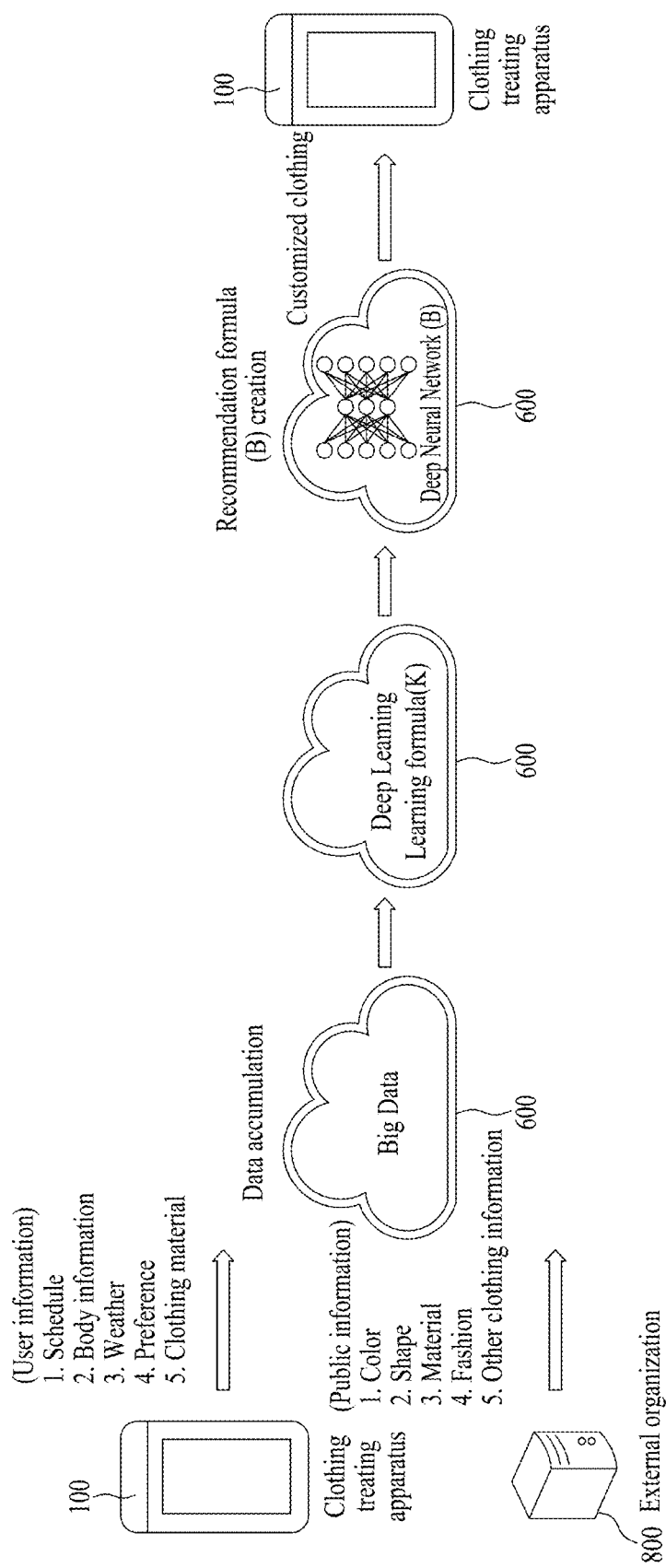
FIG. 11 shows a principle under which the on-line system according to the present disclosure may recommend clothing.
Figure 12:
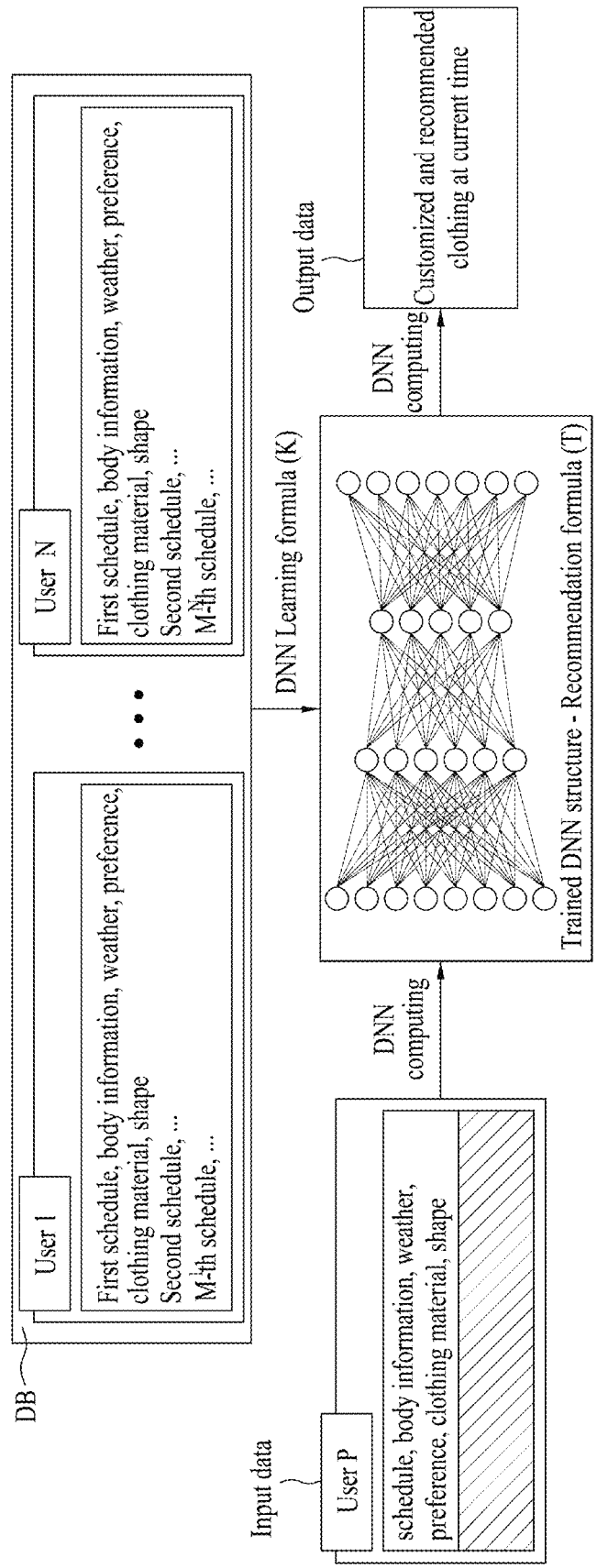
FIG. 12 shows a process of recommending clothing in the on-line system according to the present disclosure.

FIG. 11 and FIG. 12 show one embodiment in which the on-line system according to one embodiment of the present disclosure has or creates a recommendation program that may recommend the clothing suitable for the user to the user.

The clothing treating apparatus 100 shown in FIG. 11 may include a plurality of clothing treating apparatuses 100 provided from a seller or producer. That is, user information data including a schedule of each user, body information thereof, weather information, clothing preferences of the user related to the weather and schedule, and clothing material information AI may be collected in the plurality of clothing treating apparatuses 100 provided from the seller or producer and then may be transmitted to the server 600.

The clothing treating apparatus 100 may be used to recommend clothing, and thus may correspond to a clothing recommendation apparatus.

The server 600 may also receive public information data related to clothing provided from an external organization 800. The public information may include clothing information that the public uses in a public manner, in-fashion clothing information in the fashion industry, and matching colors, matching shapes, matching materials, matching fashions of the clothing obtained from culturally common clothing information, and other clothing information about clothing that the user does not have.

The server 600 may collect and accumulate data provided from the clothing treating apparatuses provided by the producers or the sellers or the external organization 800 to create big data.

The server 600 may analyze the big data to create the recommendation program itself. Alternatively, the server 600 may create the recommendation program T via deep learning of the big data.

The server 600 may perform machine learning (deep learning) via a learning formula K using the big data to analyze the pattern of the data. The learning formula K may be an algorithm that analyzes and classifies big data via deep machine learning. The learning formula K may be an algorithm that acquires a pattern of clothing worn in a specific region, a specific time, a specific day of the week, and a specific state from the big data.

As a result, the learning formula K may be an algorithm that deep machine learns mixed big data without any criterion to discover and predict clothing wearing patterns based on various criteria such as a specific region, specific time, specific day of the week, specific weather, specific population, specific schedule, specific climate, and specific income level.

Further, the learning formula K may be an algorithm that produces a recommendation formula or a recommendation program T that may predict a course and an option to be performed when use history is finally input thereto at least once. The recommendation program T may be created by the server 60 through DNN (Depp Neural Network) as the learning formula K. The recommendation program T may be an algorithm or a computing formula that analyzes the big data and derives an expected result value when a specific state is input thereto.

The recommendation program T may be an algorithm obtained via deep learning (machine learning), based on at least one of the history of the specific user and any user, and various clothing information provided from a region where the clothing treating apparatus is located, by the server 600 that manages the plurality of clothing treating apparatuses including the clothing treating apparatus.

Further, the recommendation program T may refer to an algorithm or a computing formula capable of recommending which clothing a specific user wears under what condition later, based on what clothing a certain user wears under a specific condition.

In this connection, the recommendation may include the meaning of recommending what to do, and predicting what the user will do now, thereby providing convenience.

The learning formula K deep-learns the big data to create the recommendation program T, and then continuously apply subsequently input data into the recommendation program T to train (update or develop) the recommendation program T.

Further, the learning formula K may apply the data previously collected by the clothing treating apparatus 100 and the external organization 800 back to the learning formula K in order to generate the recommendation program T to upgrade the recommendation program T via machine learning.

The server 600 may transmit the recommendation program T to the clothing treating apparatus 100, so that the recommendation program T may be pre-stored in the main storage 170 of the clothing treating apparatus 100. In this case, the recommendation unit 260 of the online system according to one embodiment of the present disclosure may be located in the clothing treating apparatus 100.

Further, the recommendation program T may be disposed in the server 600. Upon request, the clothing treating apparatus 100 may access the server 600 via the refreshing-related communication module 260 and receive the recommendation program T stored in the server 600. Alternatively, the clothing treating apparatus 100 may directly receive the recommended clothing as an execution result of the recommendation program T. In this case, the recommendation unit 260 of the online system according to one embodiment of the present disclosure may be located in the server 600.

FIG. 12 describes a principle under which the recommendation unit 260 may recommend clothing via the recommendation program T.

The storage device 630 of the server 600 may store therein a schedule, body, weather, clothing preference, and worn clothing information of a user 1 as used by the clothing treating apparatus 100 provided by the manufacturer or the seller, or as provided from the external organization in a DB format.

When M worn clothing of the user 1 are registered, the number of the DATA may be M.

Further, the storage device 630 of the server 600 may store therein a schedule, body, weather, clothing preference, and worn clothing information of a user 2 as used by the clothing treating apparatus 100 provided by the manufacturer or the seller, or as provided from the external organization in a DB format.

When M worn clothing of the user 2 are registered, the number of the DATA may be M.

When the number of users is N, the server 600 may store therein M data of worn clothing of N users, and thus, a total of N×M DATA.

The server 600 may execute machine learning (deep learning) of the DATA via the learning formula K to analyze patterns and rules in the DATA. Accordingly, the server 600 may execute the machine learning for a sufficient time duration, and thus may create the recommendation algorithm T that may recommend clothing that a specific user P is expected to wear at a present time based on the clothing worn on the plurality of the user from the DATA.

When at least one of the specific user's schedule, body, weather, and specific clothing is input to the recommendation algorithm T, the recommendation algorithm T may recommend clothing which the specific user intends or is expected to wear at a current time, or is suitable for the specific user.

The specific clothing may correspond to one of the clothing. When the user selects the bottom A3 as the specific clothing, and when the user wants to receive the recommendation of the top A2 or the overcoat A1, the bottom A3 may be input to the recommendation algorithm T.

The recommendation algorithm T may be composed a weight matrix and a bias vector.

Thus, the on-line system according to one embodiment of the present disclosure may recommend optimal clothing at the present time to increase user convenience.

In another example, the recommendation algorithm T may be stored in the external terminal device 400.

FIG. 13 to FIG. 19 show an embodiment in which the on-line system according to one embodiment of the present disclosure recommends clothing.

Figure 13:
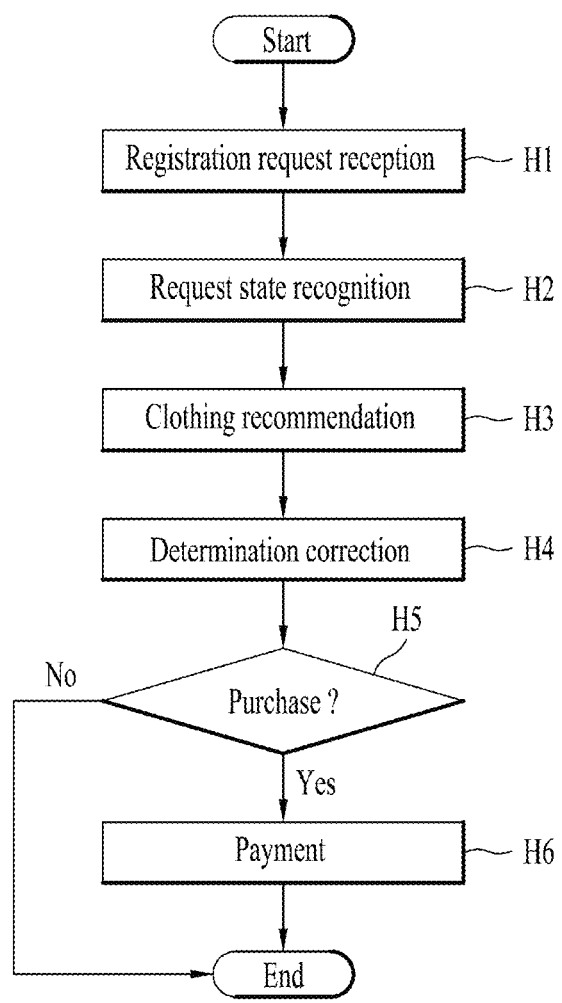
FIG. 13 shows a control method in which the on-line system according to the present disclosure recommends clothing.

FIG. 13 shows a method in which the on-line system according to one embodiment of the present disclosure recommends clothing.

The on-line system according to one embodiment of the present disclosure may perform a recommendation request receiving operation H1 of receiving a request command requesting the recommendation of the clothing suitable for the user from the user. The request command may be received via the refreshing-related input interface 150 of the clothing treating apparatus 100, or may be received via the terminal input interface 430 of the external terminal device 400.

When the recommendation request receiving operation H1 has been performed, the on-line system according to one embodiment of the present disclosure may perform a request state recognition operation H2 of identifying a request state that the user currently requests the recommendation. The request state recognition operation H2 may identify an input value input to the recommendation algorithm T. The input value may include schedule information and weather information that may be received through the external terminal device 400 or the server 600.

Further, the input value may include body information BI of a current user which may be obtained via the imaging unit 220 or the augmented storage 240. The body information BI may be used to identify the current user among the plurality of the user.

The input value may include the specific clothing currently worn on the specific user. Additional information such as a nature and a background of a place to which the user should go, and information about the companion may be further included in the input value.

The on-line system according to one embodiment of the present disclosure may input the input value to the recommendation unit 250 and execute the recommendation algorithm T and receive appropriate clothing therefrom.

The stored clothing matching unit 251 may first input the stored clothing information AI into the recommendation algorithm T and outputs the recommended clothing Z1, and the matching level determination unit 253 may calculate the matching level of the recommended clothing Z1. When the matching level is higher than or equal to a reference value, the recommended clothing Z1 may be transmitted to the augmented computing unit 230.

In one example, when the matching level of the recommended clothing Z1 is lower than the reference value, the purchase target clothing matching unit 252 may input the purchase target clothing C into the recommendation algorithm T and output the recommended clothing Z2. Then, a matching level of Z2 of the recommended clothing may be computed by the matching level determination unit 253. When the matching level is greater than or equal to the reference value, the recommended clothing Z2 may be transmitted to the augmented computing unit.

When the augmented computing unit 230 receives the recommended clothing, the clothing combination unit 237 of the augmented computing unit 230 may render the recommended clothing A on the user's body B image and output the rendering result to the virtual output interface 210. Thus, the user may identify the state in which the clothing is actually worn on the user through the virtual output interface 210.

In one example, the additional recommendation unit 254 may check whether the matching level is further improved when additional accessories, etc. are combined with the recommended clothing Z1 and Z2.

The accessory A4 may be included in either the stored clothing A or the purchase target clothing C. The additional recommendation unit 254 may transmit the accessory Z3 whose matching level with the recommended clothing is improved to the augmented computing unit 230. The additional combination unit 238 may additionally combine the recommended accessory Z3 with the rendered image.

The on-line system according to one embodiment of the present disclosure may perform a determination correction operation H4 of displaying the combined image on the virtual output interface 210 and determining the user's satisfaction.

In the determination correction operation H4, upon receiving an indication that the user is satisfied with the recommended clothing Z1 and Z2 via the refreshing-related input interface 150 or the external terminal device 400, the recommendation unit 250 may recommend the recommended clothing in a similar manner next time.

However, upon receiving an indication that the user requests further clothing or finally confirms the recommended clothing based on a comparison result via the refreshing-related input interface 150 or the external terminal device 400, the recommendation unit 250 may recommend clothing such that the user's choice or preference is considered at the next recommendation.

When the recommended clothing Z2 is present in the purchase target clothing information C, the on-line system according to one embodiment of the present disclosure may perform a purchase checking operation H5 of identifying whether the user is willing to purchase the recommended clothing Z2. The purchase checking operation H5 may include notifying that the purchase is required, and asking whether to perform the purchase via the virtual output interface 210.

The user may request the execution of the purchase via the refreshing-related input interface 150 or the external terminal device 400. The on-line system according to one embodiment of the present disclosure may perform a payment execution operation H6 of tracking the seller of the recommended clothing Z2, and proceeding with the purchase based on the payment information FI.

Figure 14:
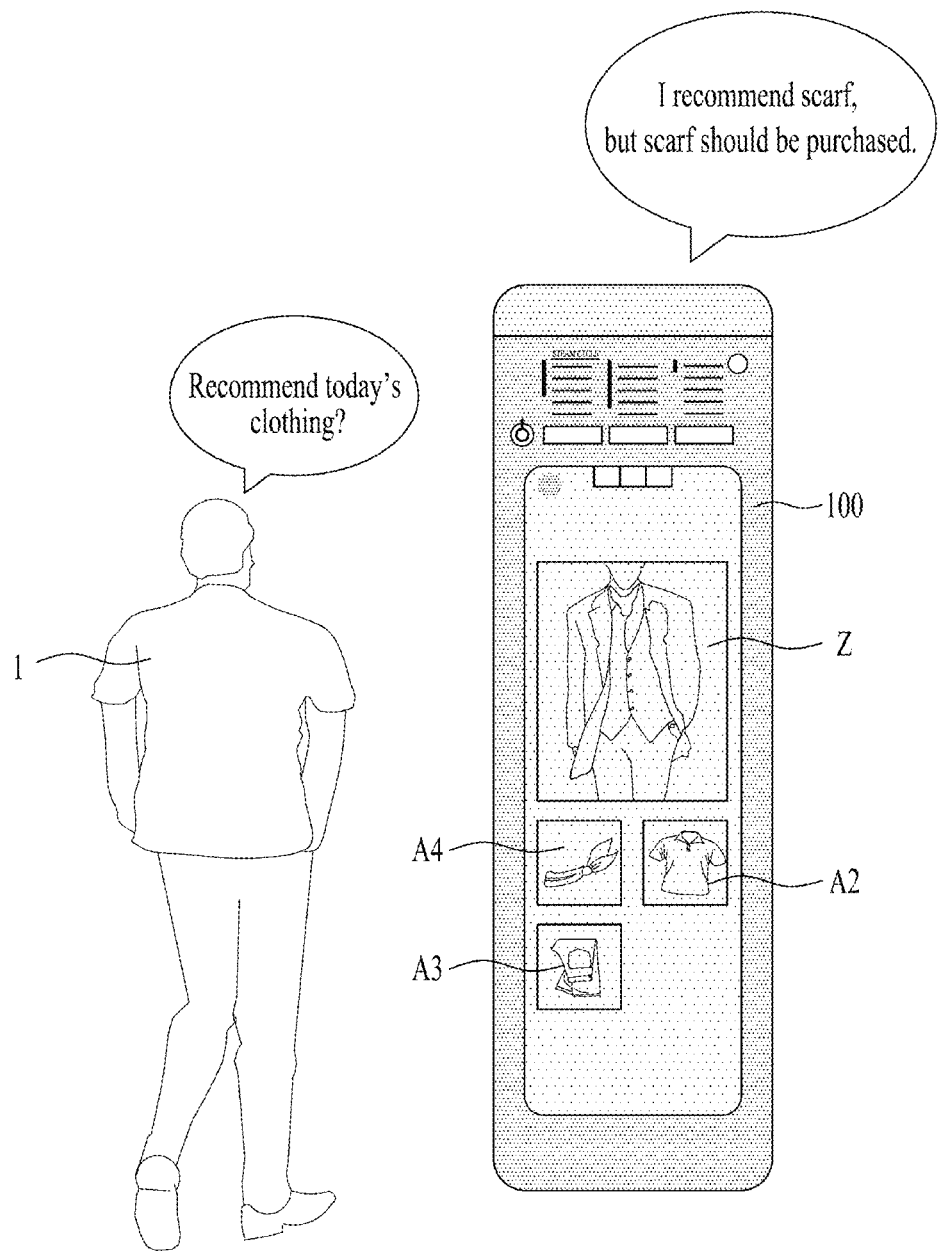
FIG. 14 shows one embodiment in which the on-line system according to the present disclosure recommends clothing.

FIG. 14 shows one embodiment in which the method for recommending the clothing is performed by the on-line system according to one embodiment of the present disclosure.

A specific user I may issue a voice command toward the clothing treating apparatus 100. The voice command may be "Recommend today's clothing". The microphone 152 of the clothing treating apparatus 100 may receive the voice command. The clothing treating apparatus 100 may receive the voice command and transmit the command to the refreshing-related main controller 180 or the server 600 to interpret the voice command, thereby performing the recommendation request receiving operation H1.

The clothing treating apparatus 100 may receive weather information, schedule information, etc. through the server 600 or the external terminal device 400, and may perform the request state recognition operation H2 of identifying the user requesting the recommendation.

The clothing treating apparatus 100 may perform the clothing recommendation operation H3 in which the recommendation unit 250 recommends the recommended clothing Z suitable for the specific user requesting the recommendation, using the database containing the stored clothing A and the purchase target clothing C stored in the augmented storage 240.

The clothing treating apparatus 100 may display the recommended clothing Z on the virtual output interface 210 as it is. The clothing treating apparatus 100 may display a list of the recommended clothing Z on the virtual output interface 21. For example, the list may include the type, price, brand, and shape of the recommended top A2, bottom A3, and accessory A4.

The recommended clothing Z may be rendered on the user's image. However, the augmented computing unit 230 may combine the recommended clothing Z itself with the virtual avatar, or output only a photo or an image of the recommended clothing Z on the virtual output interface 21.

The clothing treating apparatus 100 may perform the purchase checking operation H5 of notifying that the scarf A4 needs to be purchased when the scarf A4 is the purchase target clothing C.

Thus, the user may identify suitable clothing for the current state without having to directly select suitable clothing or remember all of the clothing he has, and may identify which clothing needs to be purchased. Furthermore, the user may improve fashion sense or fashion knowledge by identifying suitable clothing combinations.

Figure 15:
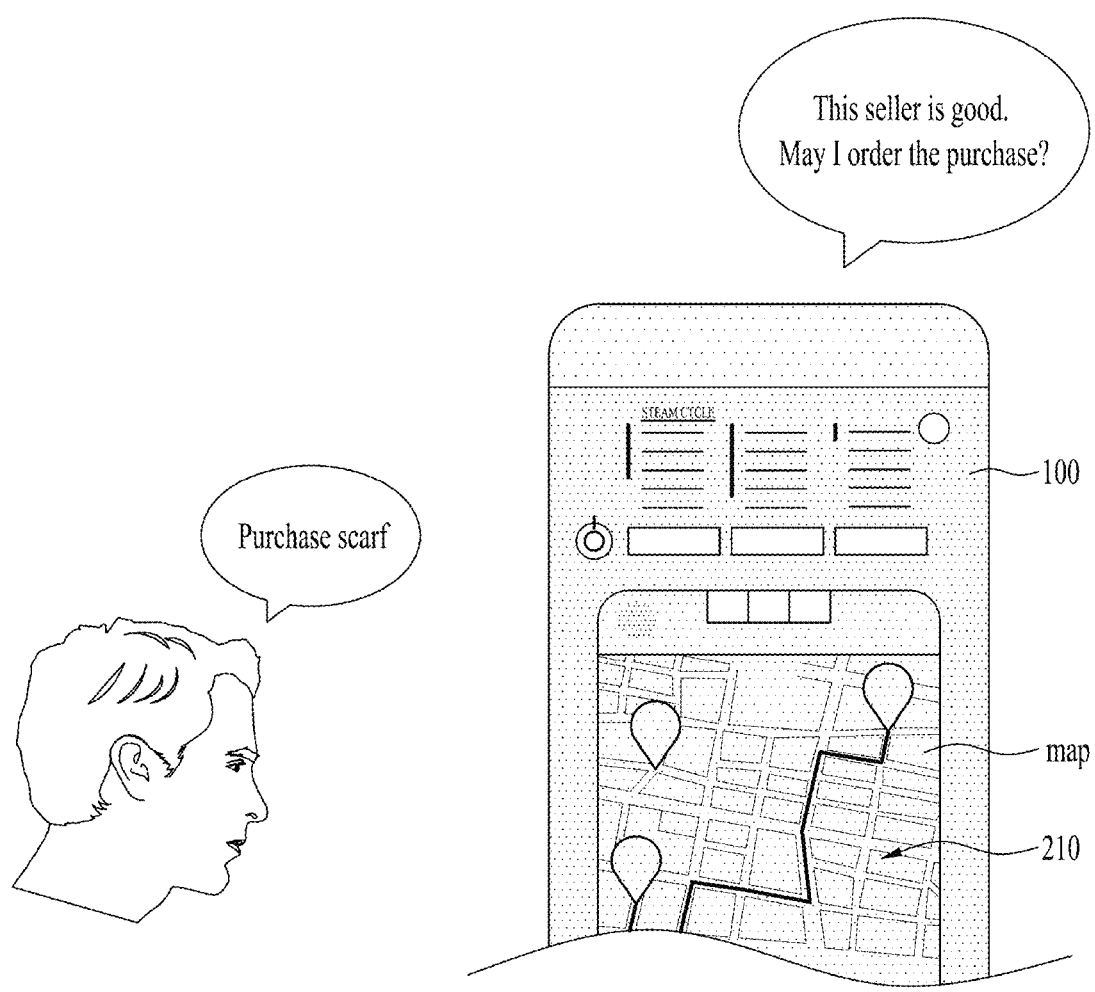
FIG. 15 shows another embodiment where the on-line system according to the present disclosure recommends clothing.

FIG. 15 shows one embodiment of the payment execution operation H6.

The clothing treating apparatus 100 may receive a voice command such as "Purchase a scarf" as a request of the purchase of clothing that the user does not own such as scarf A4. When the clothing treating apparatus 100 receives the voice command, the apparatus interprets the voice command via the refreshing-related main controller 180 or the server 600.

The clothing treating apparatus 100 may receive a result of searching for a plurality of sellers selling the scarf via the server 600. The plurality of sellers may sell the scarf online or offline and may upload the scarfs price information, etc. to an online site thereof. The information may be collected by the server 600 which in turn may provide the information to the clothing treating apparatus 100.

The clothing treating apparatus 100 may display the collected seller information on the virtual output interface 210. When there are a plurality of the sellers, a location map or online site, and selling price information of the plurality of sellers may be displayed on the virtual output interface 210. This allows the user to select a seller with good accessibility or low price.

The payment information F may be stored in the augmented storage 240 of the clothing treating apparatus 100. The server 600 may be able to access an online sales site provided by the seller. Therefore, the clothing treating apparatus 100 may purchase the scarf immediately upon receiving the user's final purchase request, and the seller may proceed with delivery thereof to a delivery address desired by the user. The delivery address may be stored in the augmented storage 240. Alternatively, the user may input the delivery address through the refreshing-related input interface 150 or the external terminal device 400.

FIG. 16 shows another embodiment in which the method for recommending the clothing is performed by the on-line system according to one embodiment of the present disclosure.

Referring to (a) in FIG. 16, in the recommendation request receiving operation H1, a specific user may send a request command requesting the recommendation of clothing in a state in which the user is wearing at least some clothing. For example, in a state in which the user is wearing a beige viscose tennis skirt A37, black three-quarter length pants A32, and top underwear A27, the specific user may send the request command requesting the recommendation of a blouse matching the tennis skirt A37.

The request command may include a specific voice command, and may include a motion command for the user to grip the tennis skirt A37 by hand. The motion command may be recognized by the motion recognition camera 222 of the imaging unit 220.

Referring to (b) in FIG. 16, the fitting unit 200 may perform a request state recognition operation H2 of imaging a specific user's state with the imaging unit 220. Based on the image captured by the imaging unit 220, the augmented computing unit 230 may recognize the state of the user's body B and the user's current clothing A.

The imaging unit 220 may image the user's state and display the state on the virtual output interface 210. The user's body image 213 and the clothing A28 and A37 worn on the user may be displayed on the virtual output interface 210.

In one example, the augmented recognition unit 230 may consider that the user has specified the "skirt A37", and thus may display an image free of the black three-quarter length pants A32 on the virtual output interface 210.

The augmented computing unit 230 may input the viscose tennis skirt A37 as the input value to the recommendation unit 250 according to the analyzed request command, but may exclude the black three-quarter length pants A32 and top underwear A27 from the input value. Thus, even when the user is wearing clothing not related to the recommendation, the on-line system according to one embodiment of the present disclosure excludes the clothing that the user does not intend to wear and may recommend only suitable clothing for the intended specific clothing.

Referring to (c) in FIG. 16, in the clothing recommendation operation H3, the recommendation unit 250 may input the specific user's schedule, weather information, preference, stored clothing information AI, body information BI, fashion, purchase target clothing information CI and the tennis skirt A37 into the recommendation program T and thus may recommend a pink blouse A212 as a suitable recommended clothing Z. The augmented computing unit 230 may render an actual size of the recommended clothing Z onto the body image 213 of the user. The rendered image may be displayed on the virtual output interface 210 as it is.

Then, the user may request the recommendation of other clothing or request the comparison and thus the system may perform the determination correction operation H4.

FIG. 17 shows another embodiment in which the method for recommending the clothing is performed by the on-line system according to one embodiment of the present disclosure.

Referring to (a) in FIG. 17, the recommendation request receiving operation H1 may be performed by the clothing treating apparatus 100 recognizing the user's voice command "Recommend clothes". The clothing treating apparatus 100 may perform the request state recognition operation H2 by imaging the specific user with the imaging unit 220.

The augmented computing unit 230 may perform the clothing recommendation operation H3 of computing the clothing Z1 suitable for the current user using the recommendation unit 250 and the augmented storage 240, and rendering a state in which the user fully wears the recommended clothing Z1 onto the user's actual image 214 and displaying the rendered image on the virtual output interface 210.

Even when the specific user is in a state wearing completely irrelevant clothing such as pajamas, the augmented computing unit 230 may render the state in which the user fully wears the recommended clothing Z1 onto the user's image 213 and may display the rendered image on the virtual output interface 210.

Referring to (b) in FIG. 17, the system may perform the determination correction operation H4 while the user is changing his/her location. For example, when the system has performed the recommendation request receiving operation H1 at a current location P1 of the user, the user may change the location to P2. The P2 may be a position adjacent to the P1.

For example, an area in front of the virtual output interface 210 and corresponding to the area of virtual output interface 210 may be divided into P1 and P2. When the user changes the location thereof between P1 and P2, the augmented computing unit may associate this change with a command to perform the determination correction operation.

Further, the position camera 222 may detect whether the changed position of the user is within a preset range. When the augmented computing unit 230 recognizes that the user's location has changed such that the location is out of the preset range, the augmented computing unit 230 may interpret the location change as a comparison command requesting that clothing other than the current recommended clothing Z1 should be recommended. In another example, the comparison command may be a direct voice command such as "Compare" from the user.

Upon receiving the comparison command, the recommendation unit 250 may recommend recommended clothing Z2 other than the recommended clothing Z1. The augmented computing unit 230 may render the other recommended clothing Z2 onto the user image and display the rendered image on the virtual output interface 210.

In the determination correction operation H4, the augmented computing unit 230 may simultaneously display the first recommended clothing Z1 and the subsequent recommended clothing Z2 on the virtual output interface 210.

Accordingly, the user may select the clothing suitable for himself while comparing the recommended plurality of clothing. Further, the user's selection may be considered as an input value of the preference to the recommendation unit 250, and may affect the output value to be recommended later.

Figure 18:
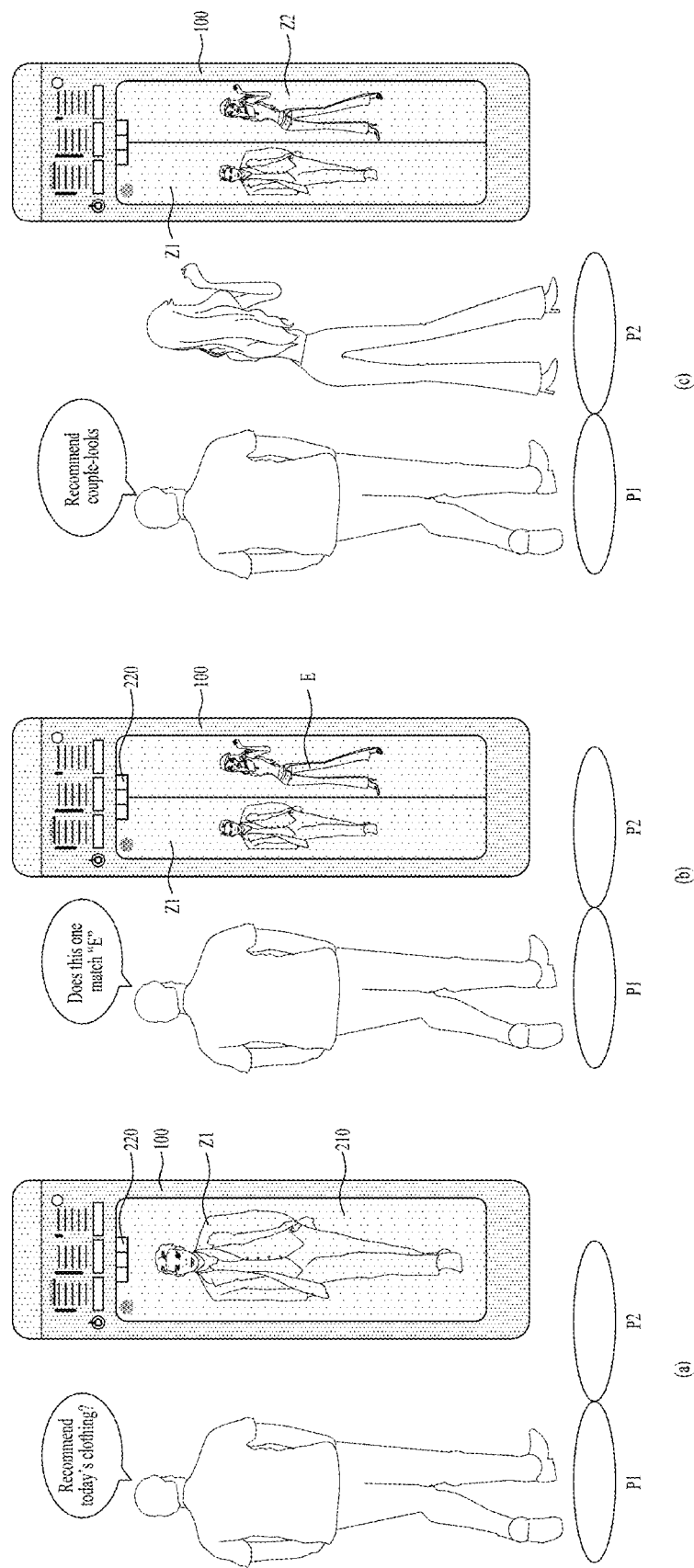
FIG. 18 shows still another embodiment in which the on-line system according to the present disclosure recommends clothing.

FIG. 18 shows another embodiment in which the method for recommending the clothing is performed by the on-line system according to one embodiment of the present disclosure.

(a) in FIG. 18 shows that the recommendation request receiving operation H1 to the clothing recommendation operation H3 are performed.

Referring to (b) in FIG. 18, in the determination correction operation H4, the user may send a request to determine whether the recommended clothing matches with another user E. When the on-line system according to one embodiment of the present disclosure receives the determination request, the system may display the combination of the recommended clothing Z1 and the other person E on the virtual output interface 210, based on the other person information EI stored in the augmented storage 240.

This allows the user to identify whether the other person E matches the recommended clothing Z1. The other person information EI may be imaged using the imaging unit 220 and then may be registered in the augmented storage 250. General photos as the other person information EI registered in the external terminal device 400 or the server 600 may be transmitted to and stored in the augmented storage 250.

Referring to (c) FIG. 18, in the additional request receiving operation H1, a plurality of the user may request clothing recommendation together. The augmented computing unit 230 may request the recommendation unit 250 to recommend a couple-look when contours of the plurality of the users are recognized from the image captured by the imaging unit 220. The recommendation unit 250 may input information about the plurality of the users to the recommendation algorithm T to output couple-looks Z1 and Z2.

The augmented computing unit 230 may render the couple-looks Z1 and Z2 onto the images of the plurality of the users and display the rendered image on the virtual output interface 210.

Accordingly, the on-line system according to one embodiment of the present disclosure may recommend the clothing for the plurality of the users at the same time or may allow the specific user to recommend the clothing suitable for another user.

FIG. 19 shows another embodiment in which the method of recommending the clothing is performed by the on-line system according to one embodiment of the present disclosure.

The on-line system according to one embodiment of the present disclosure may recommend a plurality of clothing together and display all of them on the virtual output interface 210 in the clothing recommendation operation H3 and may allow the user to directly select one of the plurality of clothing in the determination correction operation H4.

Referring to (a) in FIG. 19, the user may request the recommendation of accessory A4. The on-line system according to one embodiment of the present disclosure may recommend a plurality of scarfs among accessory A4 and display them on the display panel 211.

A first scarf A41 with the highest matching level among the plurality of scarfs may be rendered onto the user's image 213, and the rendered image may be displayed on the virtual output interface 210. A second scarf A42 and a third scarf A43 with relatively lower matching levels may be displayed in a separated manner from the user's image 213 on the display panel 211. In another example, the plurality of scarfs may be displayed virtually on the display panel 211 without being rendered on the user's image 213.

The motion recognition unit 223 of the imaging unit 220 may be configured to recognize the movement of the user's finger HP.

Referring to (b) in FIG. 19, the user may move his finger HP in the air. The motion recognition unit 223 may recognize this motion. The augmented computing unit 230 may move the plurality of scarfs displayed on the virtual output interface 210 along the motion.

For example, the first scarf A41 rendered onto the user image may be separated from the user's image 213. The third scarf A43 may be rendered onto the user's image 213.

The user may repeat the above process to determine a desired scarf among the plurality of scarfs.

Figure 20:
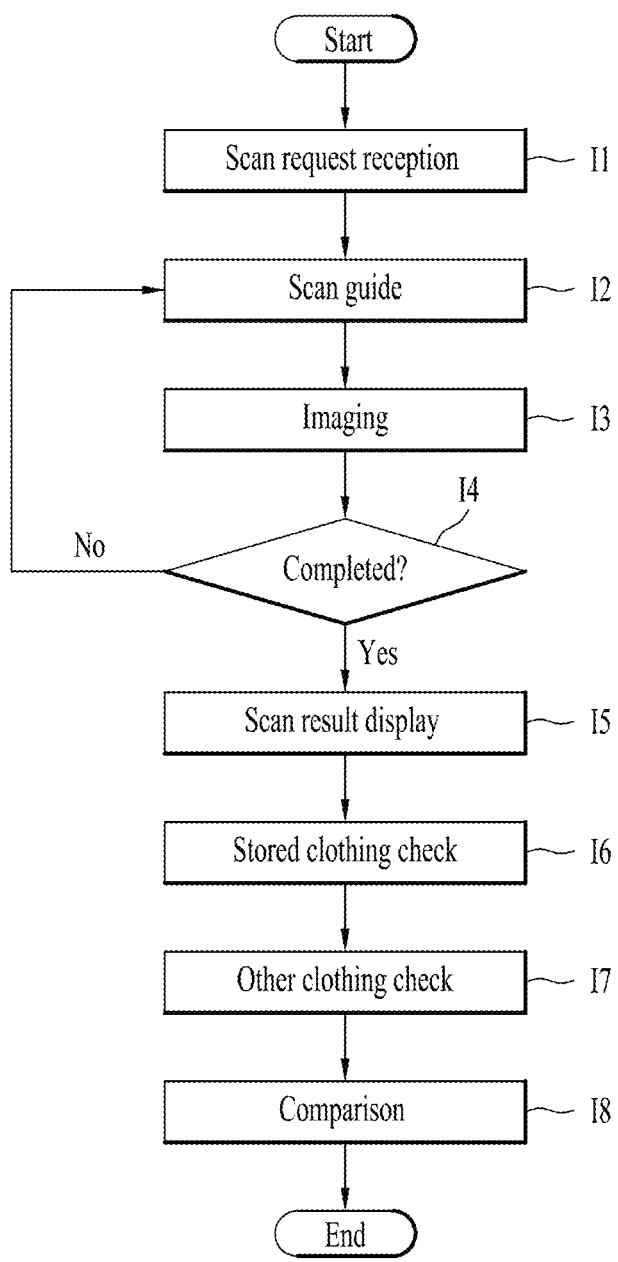
FIG. 20 shows a control method in which the on-line system according to the present disclosure scans the user's body information and utilizes the information.
Figure 21:
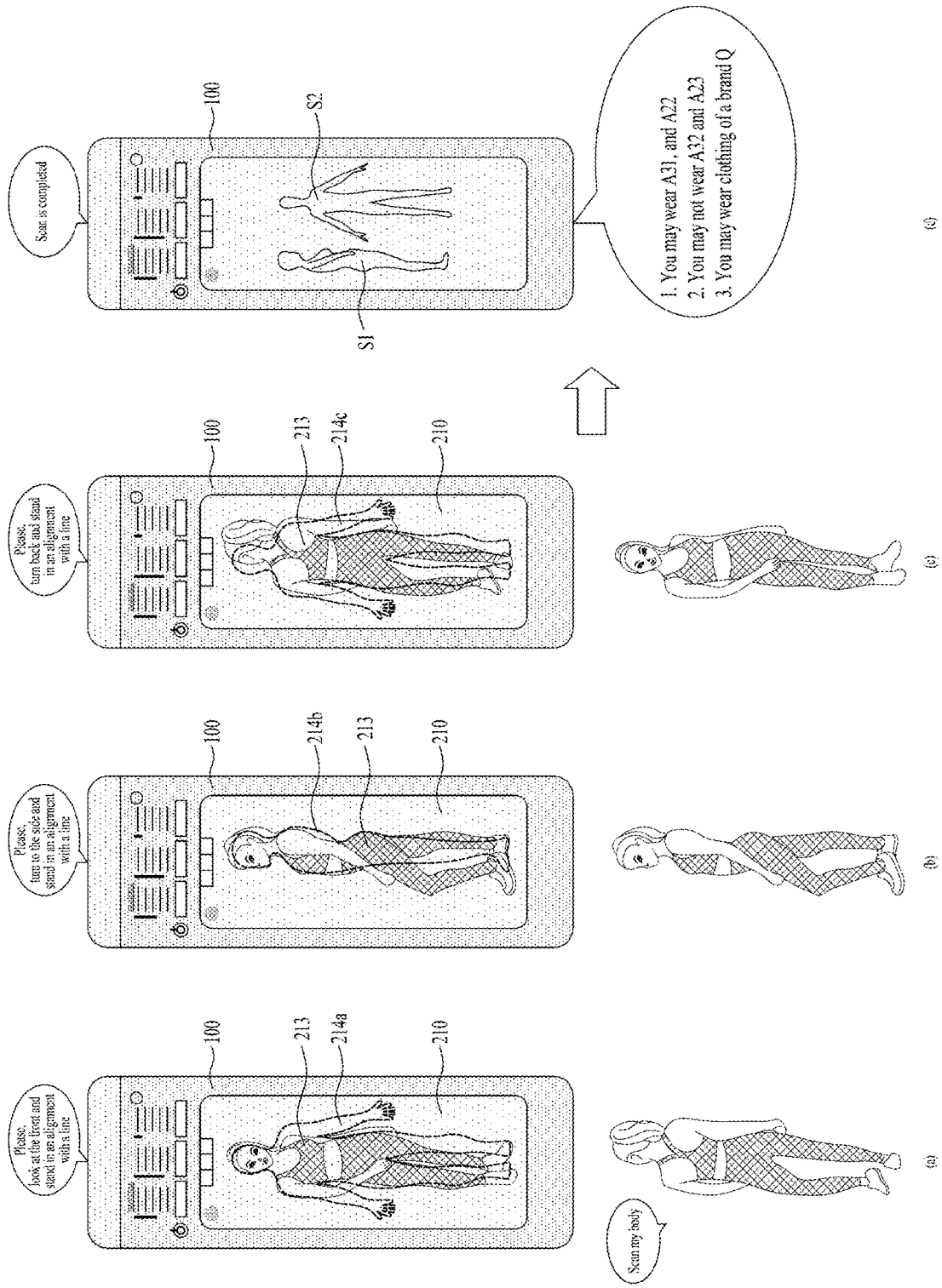
FIG. 21 shows one embodiment in which the process of FIG. 20 is performed.
Figure 22:
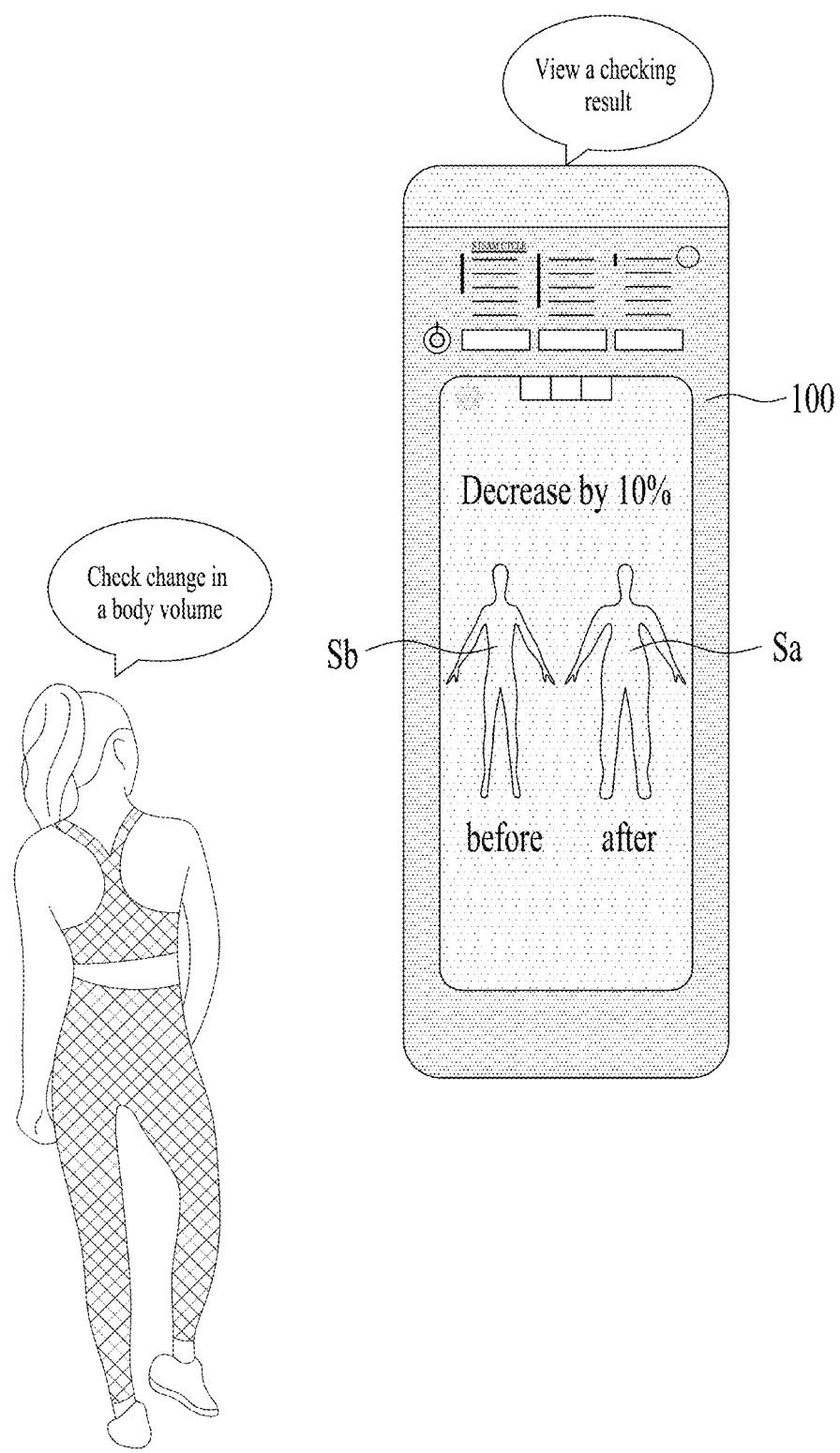
FIG. 22 shows another embodiment in which the process of FIG. 20 is performed.

FIG. 20 to FIG. 22 show another embodiment of the virtual fitting unit 200 of the on-line system according to the present disclosure.

As described above, the fitting unit 200 of the on-line system according to one embodiment of the present disclosure may store the user's body information BI obtained with the imaging unit 220 into the augmented computing unit 230, and the augmented storage 240.

In one example, the user's body information BI may change over time. For example, when the user exercises or overeats frequently, the volume of the body may increase. When the user is on a diet, the volume of the body may be reduced. The fitting unit 200 needs to update the body information BI while frequently imaging the user's body information BI with the imaging unit 220.

Accordingly, the fitting unit 200 may provide a service for notifying the user of the change in the body information BI. The fitting unit 200 may notify the user of the overall change of the body information BI using the 3D image. The change of the specific body portion may be notified to the user in the 3D manner.

Further, the fitting unit 200 may numerically express the change in the body information BI using the augmented computing unit 230. The fitting unit 200 may compare the stored clothing information AI and the purchase target clothing information CI in the augmented storage 240 with the user's body information BI, and may notify the user of which clothing may be worn on the user and which clothing may not be worn on the user, based on the body change.

Accordingly, the user may intuitively observe the changes in his or her body, as well as recognize the change in the wearable and non-wearable clothing.

The on-line system according to one embodiment of the present disclosure may perform a scan request receiving operation I1 of receiving a scan command requesting to scan his/her body from the user.

In the scan request receiving operation I1, the user may register his/her body information to the fitting unit 200, and may request change in the body information to the clothing treating apparatus 100.

The on-line system according to one embodiment of the present disclosure may perform a scan guiding operation I2 of displaying requirements necessary for the scan of the user body on the virtual output interface 210. The scan guiding operation I2 may include displaying a guide-line 214 on the display panel 211 or outputting a guidance voice from the speaker 212.

When the user's response is performed according to the scan guiding operation I2, the on-line system according to one embodiment of the present disclosure may perform an imaging operation I3 of imaging the user's body with the imaging unit 220.

In the imaging operation I3, the augmented computing unit 230 may extract the user's body contour, and may compute the user's body volume.

The on-line system according to one embodiment of the present disclosure may perform a completion determining operation I4 to check whether the image contains sufficient body information. When an additional image is needed, the scan guiding operation I2 may be repeated.

When the acquiring of the body information BI is completed, the on-line system according to one embodiment of the present disclosure may perform a scan result presenting operation I5 of displaying the user's 3D avatar image or the user's body image on the virtual output interface 210.

The on-line system according to one embodiment of the present disclosure may compare current body information BI with previous body information BI, and check the wearable and non-wearable clothing in the stored clothing information A, based on the comparing result. This operation may be referred to as a stored clothing checking operation I6.

In the stored clothing checking operation I6, a list of clothing that may and may not be worn on the user in the stored clothing information AI may be displayed on the virtual output interface 210 or the external terminal device 400. Further, in the stored clothing checking operation I6, clothing that may and may not be worn on the user in the stored clothing information AI may be displayed on the virtual output interface 210.

The on-line system according to one embodiment of the present disclosure may compare current body information BI with previous body information BI, and check the wearable and non-wearable clothing in the purchase target clothing information CI. This operation may be referred to as another clothing checking operation I7.

In the other clothing checking operation I7, a list of wearable and non-wearable clothing in the purchase target clothing information CI may be displayed on the virtual output interface 210 or the external terminal device 400.

Further, in the other clothing checking operation I7, clothing that may be worn on the use and clothing that may not be worn on the user in the purchase target clothing information CI may be displayed on the virtual output interface 210.

The on-line system according to one embodiment of the present disclosure may perform a comparing operation I8 of comparing the previous body information BI and the current body information BI with each other.

In the comparing operation I8, the previous body image or avatar and the current body image or avatar may be displayed on the virtual output interface 210, such that a change amount of the body image or avatar may be indicated numerically.

FIG. 21 shows one embodiment in which the process of FIG. 20 is performed.

Referring to (a) in FIG. 21, the user may utter a voice command "Scan my body" or input the command on the refreshing-related input interface 150 while being located in front of the clothing treating apparatus 100 to enable a scan request receiving operation I1 to be executed.

In response, the clothing treating apparatus 100 may display the guide-line 214 on the display panel 211, and may use the speaker 212 to guide the user's location or motion. This operation may be referred to as a scan guiding operation I2. When the user takes an appropriate position or motion, the clothing treating apparatus 100 may perform an imaging operation I3 of imaging the user's body.

For example, a front guide-line 214a for imaging the user's front portion may be displayed on the display panel 211. Guiding words "Please, look at the front and stand in an alignment with a line" may be output from the speaker 212. The body may be imaged when the user's body is contained in a region defined in the guide-line 214a at a certain percentage. The certain percentage may be above 70%, for example.

The clothing treating apparatus 100 may image the front portion of the user with the imaging unit 220.

Referring to (b) in FIG. 21, the display panel 211 may display a side guide-line 214b for imaging the user's side portion thereon. Guiding words "Please, turn to the side and stand in an alignment with a line" may be output from the speaker 212. The clothing treating apparatus 100 may image the user's side portion using the imaging unit 220.

In one example, the augmented computing unit 230 may determine that a rear portion image of the user is needed to complete the user's body information.

Referring to (c) FIG. 21, the display panel 211 may display a rear guide-line 214c for imaging the user's rear portion thereon. Guiding words "Please, turn back and stand in an alignment with a line" may be output from the speaker 212. The clothing treating apparatus 100 may image the user's rear portion using the imaging unit 220.

Referring to (d) in FIG. 21, the augmented computing unit 230 may extract the user's body contour from each of the images via the contour estimating unit 231. Then, the volume sensing unit 232 may calculate the actual volume of the contour.

The augmented computing unit 230 may acquire the user's body information BI based on the computed value. The body information BI may correspond to a 3D profile.

The augmented computing unit 230 may output the user's image as an avatar S on the virtual output interface 210, based on the body information BI.

The avatar S may rotate and may be output on the virtual output interface 210, and may be divided into a front avatar S2 and a side avatar S1.

Thereafter, the augmented computing unit 230 may use the comparison recognition unit 236 to analyze the stored clothing information AI and the purchase target clothing information CI together, and may compute a list of the wearable and unwearable clothing, based on the analysis result.

The virtual output interface 210 may display the list thereon. The list may include the clothing's specific identification number and brand. For example, the virtual output interface 210 may indicate that the user's body volume has been reduced by 10%, so that the user may wear A31, and A22, but may not wear A32 and A23. Further, the virtual output interface 210 may indicate that the clothing of the brand Q smaller than those of other brands may be worn on the user.

Referring to FIG. 22, the user may actively send a comparison command to the clothing treating apparatus 100 to ask for comparison between current and previous body information. When the clothing treating apparatus 100 has received the comparison command, the previous avatar Sb based on the previous body information and the current avatar SA based on the current body information may be displayed on the virtual output interface 210. Further, the virtual output interface 210 may also display the amount of the body change thereon. For example, when the volume of the user body has been reduced by 10%, words indicating that the body volume has been reduced by 10% may be output.

Thus, the user may intuitively observe the change of his/her body, and may check performances such as exercise, problems with overeating, and importance of a pose.

The above-described control method may be applied even when a plurality of the users use the on-line system. That is, the on-line system may distinguish between and store the body information of the plurality of the users in the process of obtaining the body information of the users. Further, when a specific user among the plurality of the users requests one of clothing registration, recommendation, and body scan, the on-line system may recognize the specific user, and may execute the registration of clothing, clothing recommendation, and body scan corresponding to the specific user.

Therefore, the plurality of the users may use a single on-line system to receive the service including the clothing registration, clothing recommendation, and body scan in the personalized manner without confusion.

The present disclosure may be modified and implemented in various forms, and thus the scope of the rights thereof is not limited to the above-described embodiment. Therefore, when the modified embodiment includes elements of Claims, the modified embodiment should be regarded as belonging to the scope of the present disclosure.

What is claimed is:

1. A clothing registration apparatus comprising:
a computing unit configured to analyze an image captured by an imaging unit disposed at a cabinet defining an appearance of a home appliance,
wherein the home appliance comprises a display disposed on the cabinet and an input interface for receiving a command to register clothing,
wherein the display displays a guide-line to guide the specific user to be disposed and/or rotate in a optimal location,
wherein depending on receiving the command from the input interface, the computing unit is configured to:
i) extract a clothing information of a clothing from a image of the specific user wearing the clothing captured by the imaging unit; and
ii) transmit the clothing information to a storage for registration of the clothing information.

2. The apparatus of claim 1, wherein the computing unit is further configured to:
iii) transmit a user information of the specific user with the clothing information to the storage.

3. The apparatus of claim 2, wherein the clothing information is matched with the user information and registered in the storage.

4. The apparatus of claim 2, wherein if the user information is pre-stored in the storage, the clothing information is matched with the user information and registered in the storage.

5. The apparatus of claim 2, wherein if the computer unit fails to identify the user information of the specific user, the display displays a message requesting to register the specific user.

6. The apparatus of claim 2, wherein the computing unit is further configured to:

iv) extract the clothing information by comparing a appearance of the specific user with pre-prepared user information of the specific user.

7. The apparatus of claim 6, wherein the user information is pre-stored in the storage.

8. The apparatus of claim 6, wherein the computing unit is further configured to:
   v) extract the appearance of the specific user by comparing the image with pre-prepared background information.

9. The apparatus of claim 8, wherein the background information is pre-stored in the storage.

10. The apparatus of claim 1, wherein the clothing information including at least one of a shape, a material, and a color from the clothing.

11. The apparatus of claim 1, wherein the user information is obtained from a image captured by the imaging unit.

12. The apparatus of claim 1, wherein the display displays a guide sign to guide the specific user to rotate a degree.

13. The apparatus of claim 12, wherein the guide sign to guide the specific user to rotate in a 360 degree.

14. The apparatus of claim 1, wherein the computing unit is further configured to:
   i-i) recognize an overcoat, a top and a bottom from the image; and
   i-ii) individually extract clothing information of at least one of the overcoat, the top or the bottom.

15. The apparatus of claim 14, wherein the computing unit is further configured to:
   vi) separate the overcoat, the top and the bottom from each other;
   vii) transmit the extracted clothing information to the storage for separate registration.

* * * * *